United States Patent
Ma et al.

(10) Patent No.: US 10,983,290 B2
(45) Date of Patent: Apr. 20, 2021

(54) FIBER OPTIC CONNECTOR WITH RELEASEABLE PULL/PUSH TAB WITH SECURING PROTRUSIONS

(71) Applicant: Senko Advanced Components, Inc., Marlborough, MA (US)

(72) Inventors: Siu Kei Ma, Kowloon (HK); Kim Man Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/687,504

(22) Filed: Nov. 18, 2019

(65) Prior Publication Data

US 2020/0132937 A1  Apr. 30, 2020

Related U.S. Application Data

(63) Continuation of application No. 16/123,835, filed on Sep. 6, 2018, now Pat. No. 10,520,688, which is a continuation of application No. 15/981,309, filed on May 16, 2018, now Pat. No. 10,078,188, which is a continuation-in-part of application No. 15/720,980, filed on Sep. 29, 2017, now Pat. No. 10,228,521.

(60) Provisional application No. 62/665,217, filed on May 1, 2018, provisional application No. 62/546,920, filed on Aug. 17, 2017, provisional application No. 62/457,150, filed on Feb. 9, 2017, provisional application No. 62/452,147, filed on Jan. 30, 2017, provisional application No. 62/430,560, filed on Dec.

(Continued)

(51) Int. Cl.
*G02B 6/38* (2006.01)

(52) U.S. Cl.
CPC .......... *G02B 6/3893* (2013.01); *G02B 6/381* (2013.01); *G02B 6/389* (2013.01); *G02B 6/3882* (2013.01)

(58) Field of Classification Search
None
See application file for complete search history.

(56) References Cited

U.S. PATENT DOCUMENTS

| 4,150,790 A | 4/1979 | Potter |
| 4,327,964 A | 5/1982 | Haesly |
| 4,478,473 A | 10/1984 | Frear |

(Continued)

FOREIGN PATENT DOCUMENTS

| AU | 2013256244 B2 | 2/2017 |
| CA | 2495693 A1 | 4/2004 |

(Continued)

OTHER PUBLICATIONS

"Fiber Optic; Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8D8C7DE2EB72D315%26binarytype%3D48403DAA363AEB7E&ei=ZvcvTujWH4ntrAfH-dXZCg&usg=AFQjCNE1MdC-4avewRJU6IDVc__WYbr0QQ.

(Continued)

*Primary Examiner* — Jerry Rahll
(74) *Attorney, Agent, or Firm* — Edward S. Jarmolowicz, Esq.

(57) ABSTRACT

A fiber optic connector having a push/pull tab wherein the push/pull tab travel is limited by an internal stop to release a connector from a receptacle, and the push/pull tab is (Continued)

releasably secured from connector. The push/pull tab has a plural of securing protrusions that secure the tab to the connector housing.

5 Claims, 28 Drawing Sheets

Related U.S. Application Data 6, 2016, provisional application No. 62/430,067, filed on Dec. 5, 2016.

(56) References Cited

U.S. PATENT DOCUMENTS

| | | | |
|---|---|---|---|
| 4,762,388 A | 8/1988 | Tanaka | |
| 4,764,129 A | 8/1988 | Jones | |
| 4,840,451 A | 6/1989 | Sampson | |
| 4,872,736 A | 10/1989 | Myers | |
| 4,979,792 A | 12/1990 | Weber | |
| 5,041,025 A | 8/1991 | Haitmanek | |
| D323,143 S | 1/1992 | Ohkura | |
| 5,212,752 A | 5/1993 | Stephenson | |
| 5,265,181 A | 11/1993 | Chang | |
| 5,289,554 A | 2/1994 | Cubukciyan | |
| 5,317,663 A | 5/1994 | Beard | |
| 5,335,301 A | 8/1994 | Newman | |
| 5,348,487 A | 9/1994 | Marazzi | |
| 5,444,806 A | 8/1995 | de Marchi | |
| 5,481,634 A | 1/1996 | Anderson | |
| 5,506,922 A | 4/1996 | Grois | |
| 5,521,997 A | 5/1996 | Rovenolt | |
| 5,570,445 A | 10/1996 | Chou | |
| 5,588,079 A | 12/1996 | Tanabe | |
| 5,684,903 A | 11/1997 | Kyomasu | |
| 5,687,268 A | 11/1997 | Stephenson | |
| 5,781,681 A | 7/1998 | Manning | |
| 5,845,036 A * | 12/1998 | De Marchi | G02B 6/3849 |
| | | | 385/139 |
| 5,937,130 A | 8/1999 | Amberg | |
| 5,956,444 A | 9/1999 | Duda | |
| 5,971,626 A | 10/1999 | Knodell | |
| 6,041,155 A | 3/2000 | Anderson | |
| 6,049,040 A | 4/2000 | Biles | |
| 6,134,370 A | 10/2000 | Childers | |
| 6,178,283 B1 | 1/2001 | Weigel | |
| 6,206,577 B1 | 3/2001 | Hall, III | |
| 6,206,581 B1 | 3/2001 | Driscoll | |
| 6,227,717 B1 | 5/2001 | Ott | |
| 6,238,104 B1 | 5/2001 | Yamakawa | |
| 6,247,849 B1 | 6/2001 | Liu | |
| 6,276,840 B1 | 8/2001 | Weiss | |
| 6,364,537 B1 | 4/2002 | Maynard | |
| 6,364,685 B1 | 4/2002 | Manning | |
| 6,461,054 B1 | 10/2002 | Iwase | |
| 6,471,412 B1 | 10/2002 | Belenkiy | |
| 6,478,472 B1 | 11/2002 | Anderson | |
| 6,551,117 B2 | 4/2003 | Poplawski | |
| 6,579,014 B2 | 6/2003 | Melton | |
| 6,634,801 B1 | 10/2003 | Waldron | |
| 6,648,520 B2 | 11/2003 | McDonald | |
| 6,668,113 B2 | 12/2003 | Togami | |
| 6,682,228 B2 | 1/2004 | Rathnam | |
| 6,685,362 B2 | 2/2004 | Burkholder | |
| 6,695,486 B1 | 2/2004 | Falkenberg | |
| 6,716,052 B2 | 4/2004 | Kane | |
| 6,758,601 B2 | 7/2004 | Holmquist | |
| 6,848,836 B2 | 2/2005 | Ueda | |
| 6,854,894 B1 | 2/2005 | Yunker | |
| 6,872,039 B2 | 3/2005 | Baus | |
| 6,935,789 B2 | 8/2005 | Gross, III | |
| 7,052,186 B1 | 5/2006 | Bates | |
| 7,065,232 B2 | 6/2006 | Geng | |
| 7,090,406 B2 | 8/2006 | Melton | |
| 7,090,407 B2 | 8/2006 | Melton | |
| 7,091,421 B2 | 8/2006 | Kukita | |
| 7,111,990 B2 | 9/2006 | Melton | |
| 7,113,679 B2 | 9/2006 | Melton | |
| D533,504 S | 12/2006 | Lee | |
| D534,124 S | 12/2006 | Taguchi | |
| 7,153,041 B2 | 12/2006 | Mine | |
| 7,198,409 B2 | 4/2007 | Smith | |
| 7,207,724 B2 | 4/2007 | Gurreri | |
| D543,146 S | 5/2007 | Chen | |
| 7,258,493 B2 | 8/2007 | Milette | |
| 7,281,859 B2 | 10/2007 | Mudd | |
| 7,303,438 B2 | 12/2007 | Dawiedczyk | |
| D558,675 S | 1/2008 | Chien | |
| 7,315,682 B1 | 1/2008 | En Lin | |
| 7,325,976 B2 | 2/2008 | Gurreri | |
| 7,325,980 B2 | 2/2008 | Pepe | |
| 7,329,137 B2 | 2/2008 | Martin | |
| 7,354,291 B2 | 4/2008 | Caveney | |
| 7,371,082 B2 | 5/2008 | Zimmel | |
| 7,390,203 B2 | 6/2008 | Murano | |
| D572,661 S | 7/2008 | En Lin | |
| 7,431,604 B2 | 10/2008 | Waters | |
| 7,473,124 B1 * | 1/2009 | Briant | H01R 13/6275 |
| | | | 439/352 |
| 7,510,335 B1 | 3/2009 | Su | |
| 7,513,695 B1 | 4/2009 | Lin | |
| 7,591,595 B2 | 9/2009 | Lu | |
| 7,594,766 B1 | 9/2009 | Sasser | |
| 7,695,199 B2 | 4/2010 | Teo | |
| 7,699,533 B2 | 4/2010 | Milette | |
| 7,824,113 B2 | 11/2010 | Wong | |
| 7,837,395 B2 | 11/2010 | Lin | |
| D641,708 S | 7/2011 | Yamauchi | |
| 8,083,450 B1 | 12/2011 | Smith | |
| 8,186,890 B2 | 5/2012 | Lu | |
| 8,192,091 B2 | 6/2012 | Hsu | |
| 8,202,009 B2 | 6/2012 | Lin | |
| 8,244,089 B2 | 8/2012 | Chen | |
| 8,251,733 B2 | 8/2012 | Wu | |
| 8,270,796 B2 | 9/2012 | Nhep | |
| 8,651,749 B2 | 2/2014 | Júnior | |
| 9,207,410 B2 | 12/2015 | Lee | |
| 9,366,829 B2 | 6/2016 | Czosnowski | |
| 9,411,110 B2 | 8/2016 | Barnette, Jr. | |
| 9,494,744 B2 | 11/2016 | de Jong | |
| 9,548,557 B2 | 1/2017 | Liu | |
| 9,551,842 B2 | 1/2017 | Theuerkorn | |
| 9,568,686 B2 | 2/2017 | Fewkes | |
| 9,581,768 B1 | 2/2017 | Baca | |
| 9,599,778 B2 | 3/2017 | Wong | |
| 9,658,409 B2 | 5/2017 | Gniadek | |
| 9,684,313 B2 | 6/2017 | Chajec | |
| 9,709,753 B1 | 7/2017 | Chang | |
| 9,726,830 B1 | 8/2017 | Gniadek | |
| 9,739,955 B2 | 8/2017 | Lee | |
| 9,869,825 B2 | 1/2018 | Bailey | |
| 10,038,280 B2 * | 7/2018 | Schaefer | H01R 43/26 |
| 10,185,100 B2 * | 1/2019 | Takano | G02B 6/3887 |
| 10,228,521 B2 * | 3/2019 | Gniadek | G02B 6/3893 |
| 10,416,394 B2 | 9/2019 | Takano | |
| 2003/0053787 A1 | 3/2003 | Lee | |
| 2003/0063862 A1 | 4/2003 | Fillion | |
| 2004/0052473 A1 | 3/2004 | Seo | |
| 2004/0136657 A1 | 7/2004 | Ngo | |
| 2004/0141693 A1 | 7/2004 | Szilagyi | |
| 2004/0161958 A1 | 8/2004 | Togami | |
| 2004/0234209 A1 | 11/2004 | Cox | |
| 2005/0111796 A1 | 5/2005 | Matasek | |
| 2005/0141817 A1 | 6/2005 | Yazaki | |
| 2006/0089049 A1 | 4/2006 | Sedor | |
| 2006/0127025 A1 | 6/2006 | Haberman | |
| 2006/0140543 A1 | 6/2006 | Abendschein | |
| 2006/0269194 A1 | 11/2006 | Luther | |
| 2006/0274411 A1 | 12/2006 | Yamauchi | |
| 2007/0028409 A1 | 2/2007 | Yamada | |
| 2007/0079854 A1 | 4/2007 | You | |
| 2007/0098329 A1 | 5/2007 | Shimoji | |
| 2007/0149062 A1 | 6/2007 | Long | |
| 2007/0230874 A1 | 10/2007 | Lin | |

(56) References Cited

U.S. PATENT DOCUMENTS

| | | |
|---|---|---|
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0069501 A1 | 3/2008 | Mudd |
| 2008/0101757 A1 | 5/2008 | Lin |
| 2008/0267566 A1 | 10/2008 | En Lin |
| 2009/0028507 A1 | 1/2009 | Jones |
| 2009/0196555 A1 | 8/2009 | Lin |
| 2009/0214162 A1 | 8/2009 | O'Riorden |
| 2009/0220197 A1 | 9/2009 | Gniadek |
| 2009/0290938 A1 | 11/2009 | Asaoka |
| 2009/0291584 A1* | 11/2009 | Wu .................... H01R 13/6335 439/345 |
| 2010/0239220 A1 | 9/2010 | Lin |
| 2010/0247041 A1 | 9/2010 | Szilagyi |
| 2010/0322561 A1 | 12/2010 | Lin |
| 2011/0044588 A1 | 2/2011 | Larson |
| 2011/0131801 A1 | 6/2011 | Nelson |
| 2011/0177710 A1 | 7/2011 | Tobey |
| 2011/0267742 A1 | 11/2011 | Togami |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0183012 A1 | 7/2013 | Lopez |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0133808 A1 | 5/2014 | Hill |
| 2014/0219621 A1 | 8/2014 | Barnette, Jr. |
| 2014/0226946 A1 | 8/2014 | Cooke |
| 2014/0241678 A1 | 8/2014 | Bringuier |
| 2014/0241688 A1 | 8/2014 | Isenhour |
| 2014/0331464 A1 | 11/2014 | Jiang et al. |
| 2014/0348477 A1 | 11/2014 | Chang |
| 2015/0111417 A1 | 4/2015 | Vanderwoud |
| 2015/0301294 A1 | 10/2015 | Chang |
| 2015/0331201 A1 | 11/2015 | Takano |
| 2015/0355417 A1 | 12/2015 | Takano |
| 2015/0378113 A1 | 12/2015 | Good |
| 2016/0131849 A1 | 5/2016 | Takano |
| 2016/0172852 A1 | 6/2016 | Tamura |
| 2016/0231512 A1 | 8/2016 | Seki |
| 2016/0266326 A1 | 9/2016 | Gniadek |
| 2016/0320572 A1 | 11/2016 | Gniadek |
| 2017/0003458 A1 | 1/2017 | Gniadek |
| 2018/0217338 A1 | 8/2018 | Takano et al. |

FOREIGN PATENT DOCUMENTS

| | | |
|---|---|---|
| CN | 2836038 Y | 11/2006 |
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 2/2001 |
| EP | 1211537 A2 | 6/2002 |
| EP | 1245980 A2 | 10/2002 |
| EP | 1566674 A1 | 8/2005 |
| EP | 1810378 B1 | 6/2011 |
| GB | 2111240 A | 6/1983 |
| GB | 2538089 B | 6/2019 |
| JP | 6006575 B2 | 1/1994 |
| JP | 6247576 A | 9/1994 |
| JP | 03723703 B2 | 12/2005 |
| JP | 2009229545 A | 10/2009 |
| JP | 2009276493 A | 11/2009 |
| JP | 2016134234 A | 7/2016 |
| TW | 200821653 A | 5/2008 |
| TW | I464471 B | 12/2014 |
| TW | 1628481 B | 7/2018 |
| WO | WO2001079904 A2 | 10/2001 |
| WO | WO2004027485 A1 | 4/2004 |
| WO | WO2008112986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |
| WO | WO2014028527 A2 | 2/2014 |
| WO | WO2014182351 A1 | 11/2014 |
| WO | WO2015191024 A1 | 12/2015 |
| WO | 2018/140873 A1 | 8/2018 |

OTHER PUBLICATIONS

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Katalog-Glenair-LWL-1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

European Search Report and Written Opinion dated Feb. 19, 2015 for EP 14168005.

European Search Report and Written Opinion dated Mar. 3, 2015 for EP 14187661.

International Preliminary Report on Patentability dated Sep. 14. 2017 from related International Application No. PCT/US2015/059458, International Filing Date Nov, 6, 2015.

International Search Report (ISR) WO2008112986 dated Sep. 15, 2009.

International Search Report and Written Opinion dated Apr. 27, 2012 for PCT/US2011/058799.

International Search Report and Written Opinion dated Aug. 21, 2008 for PCT/US2008/057023.

International Search Report and Written Opinion dated Aug, 27, 2012 for PCT/US2017/039126.

International Search Report and Written Opinion dated Aug. 29, 2014 for PCT/US2014/041500.

International Search Report and Written Opinion dated Jan. 16, 2014 for PCT/US2013/54784.

International Search Report and Written Opinion dated May 14, 2014 for PCT/US2014/012137.

ISR WO2012162385ISR dated Nov. 29. 2012.

ISR WO2014028527ISR dated Jul. 16, 2015.

1SR WO2015191024ISR dated Oct. 9, 2014.

ISR WO2015US57610ISR dated Sep. 22, 2016.

ISR WO2016148741ISR dated Sep. 22, 2016.

ISR WO2016176083ISR dated May 19, 2016,.

Partial Supplementary European Search Report for European Application No. 17881985.0, dated Mar. 5, 2021, 15 pages Muenchen, Germany.

Chinese Office Action for Application No. 201910357979.0, dated Feb. 25, 2021, 3 pages.

* cited by examiner

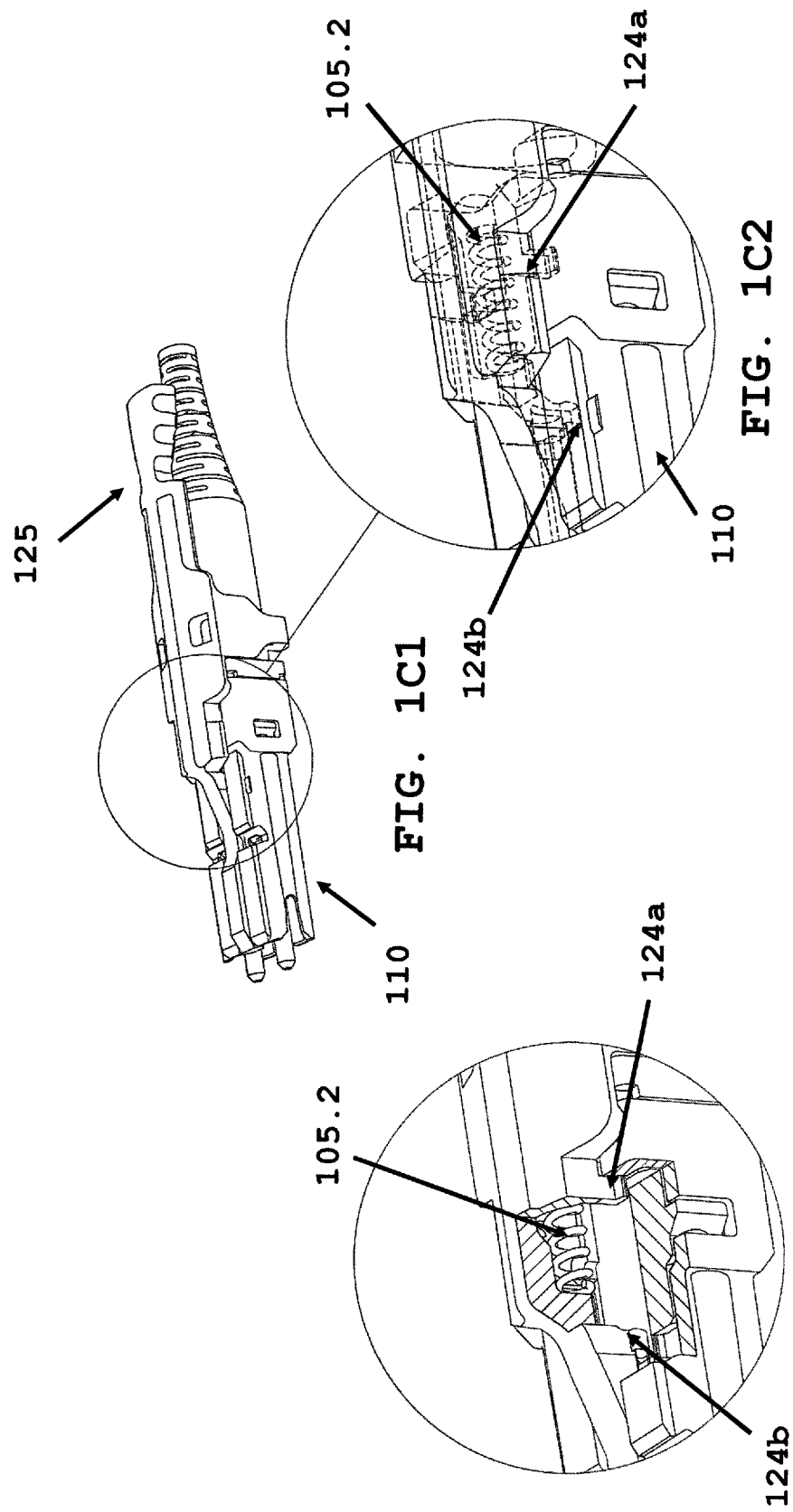

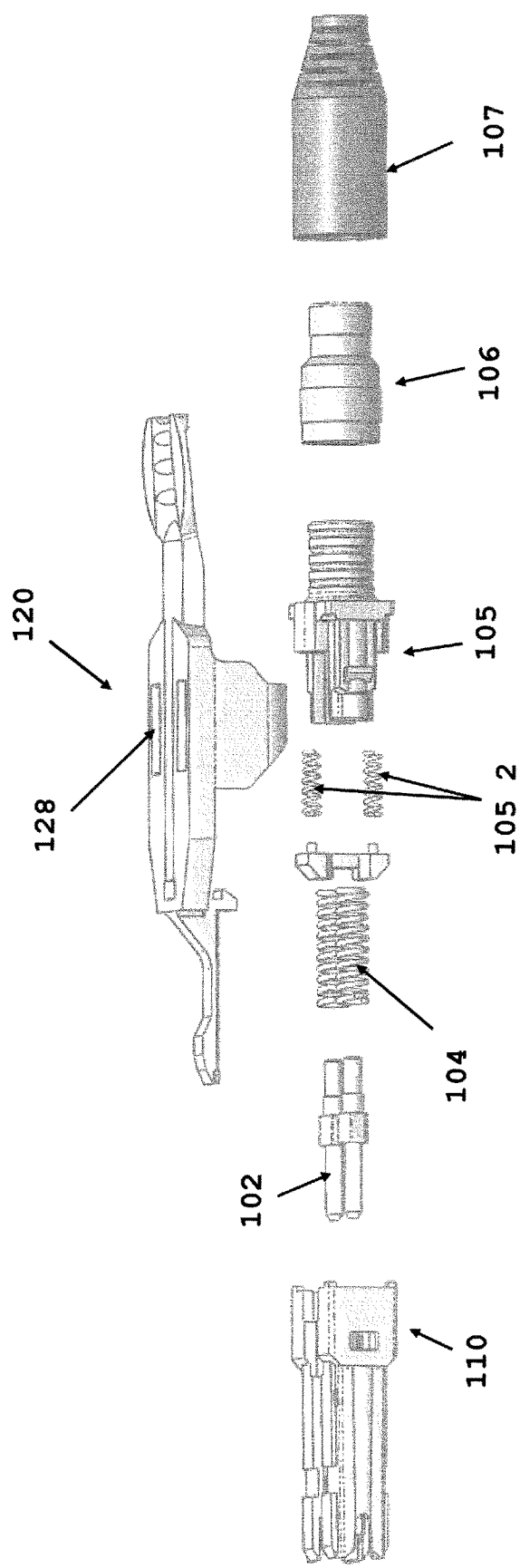

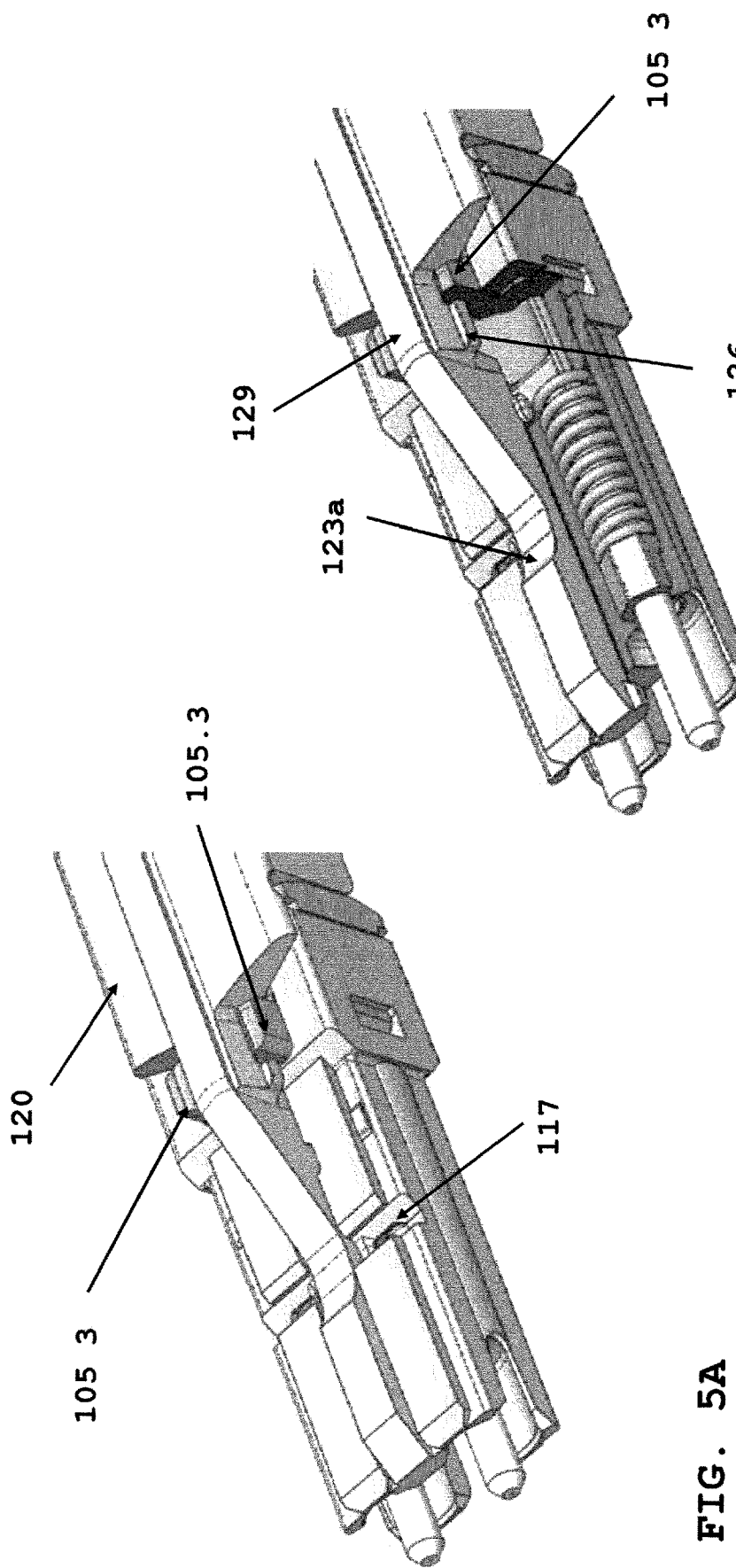

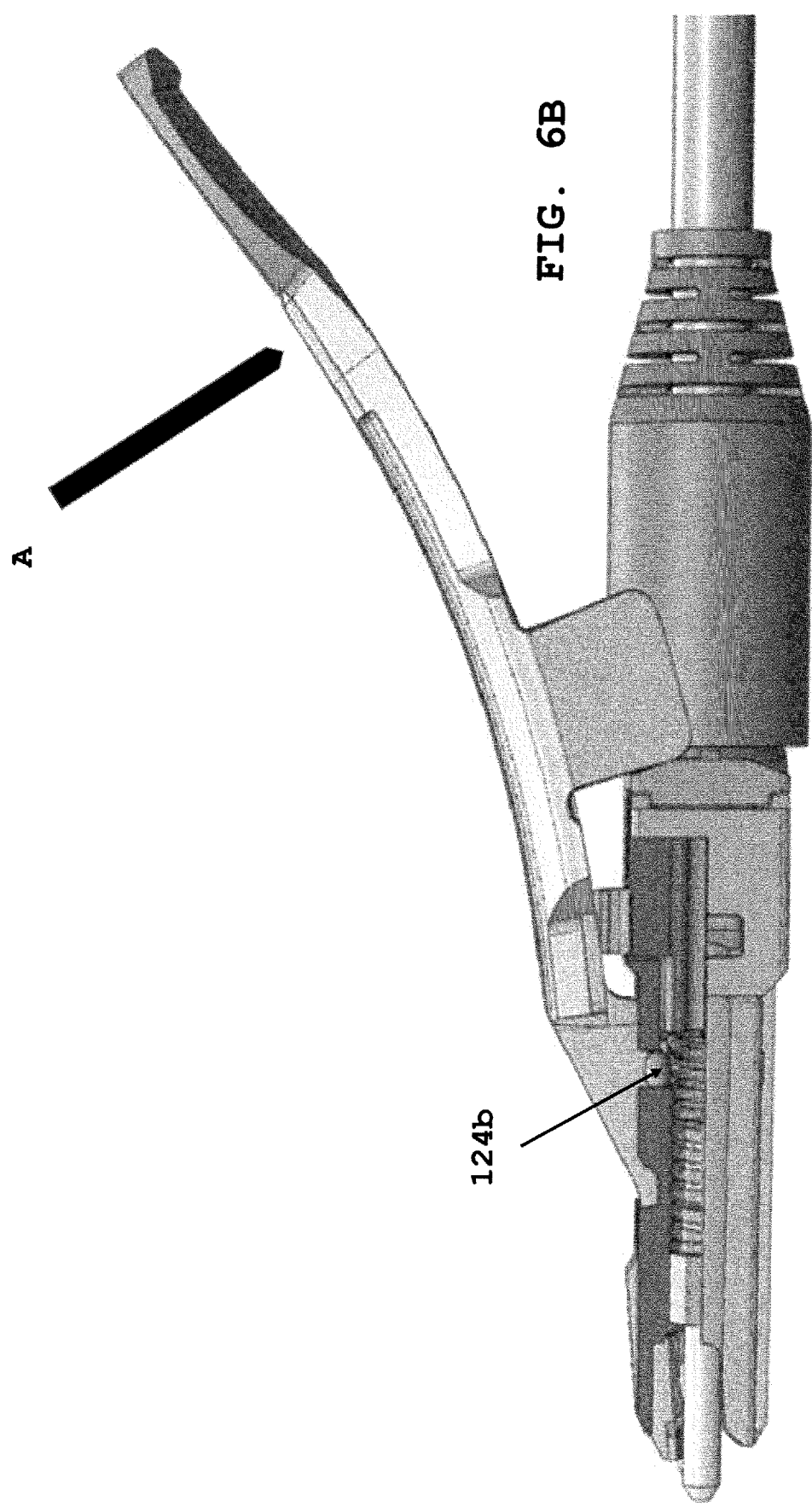

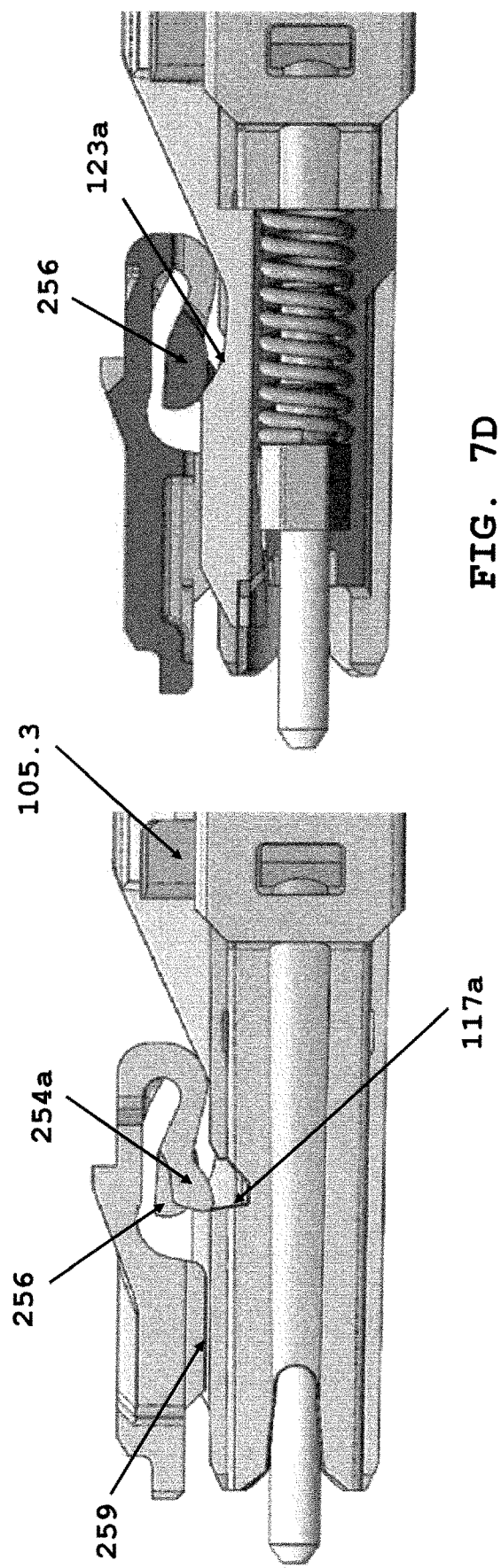

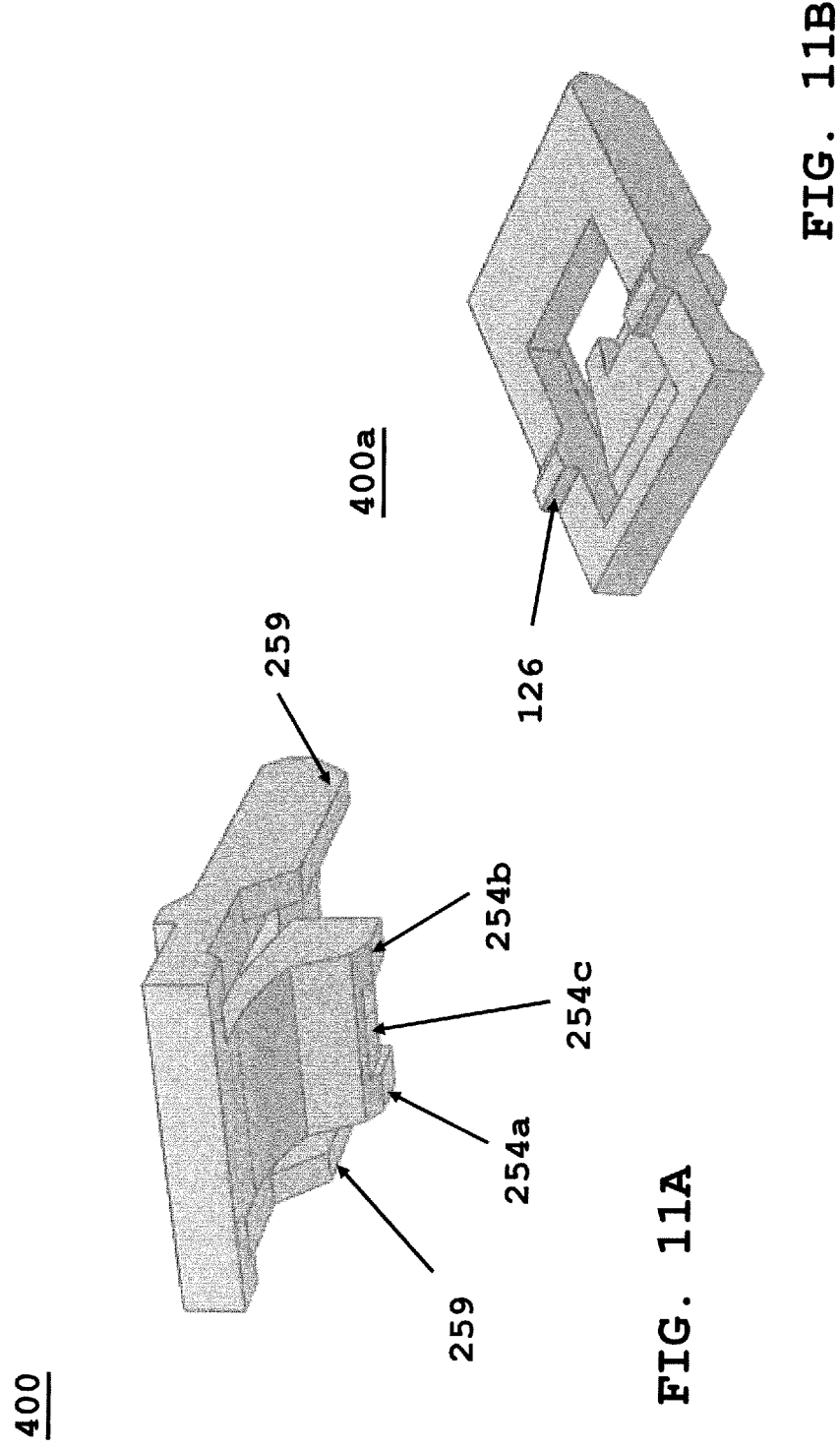

FIBER OPTIC CONNECTOR WITH RELEASEABLE PULL/PUSH TAB WITH SECURING PROTRUSIONS

CROSS-REFERENCES TO RELATED APPLICATIONS

This application is a continuation of U.S. patent application Ser. No. 16/123,835 field in Sep. 6, 2018, titled "Fiber Optic Connector with Releasable Pull/Push Tab Using a Removal Tool", which is a continuation of U.S. patent application Ser. No. 15/981,309, entitled "SPRINGLESS PUSH/PULL FIBER OPTIC CONNECTOR", which claims priority to U.S. Provisional Application No. 62/665,217, entitled "SPRINGLESS PUSH/PULL FIBER OPTIC CONNECTOR", filed on May 1, 2018 under 35 U.S.C. 119(e), and further is a continuation-in-part of U.S. non-Provisional application Ser. No. 15/720,980, entitled "NARROW WIDTH ADAPTERS AND CONNECTORS WITH MODULAR LATCHING ARM", filed Sep. 29, 2017, which claims priority to U.S. Provisional Application No. 62/546,920 entitled "NARROW WIDTH ADAPTERS AND CONNECTORS WITH MODULAR LATCHING ARM", filed on Aug. 17, 2017, U.S. Provisional Application No. 62/457,150, entitled "OPTICAL FIBER CONNECTOR", filed on Feb. 9, 2017, U.S. Provisional Application No. 62/452,147, entitled "NARROW WIDTH ADAPTERS AND CONNECTORS WITH MODULAR LATCHING ARM" filed on Jan. 30, 2017, U.S. Provisional Application No. 62/430,560 entitled "Narrow Width Adapters and Connectors with Spring Loaded Remote Release", filed on Dec. 6, 2016 and U.S Provisional Application No. 62/430,067 entitled "Narrow Width Adapters and Connectors with Spring Loaded Remote Release", filed on Dec. 5, 2016, each of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to fiber optic connectors and adapters, and more particularly, to fiber optic connectors with a push/pull tab or extender attached to a latch that upon pulling said tab the connector is unlatched or released from an adapter receptacle.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a fiber optic connector mates with a receptacle, the latter may be an opening configured to receive a push/pull tab fiber optic connector. The fiber optic connector contains a push/pull tab connected to a front body of the connector, the front body accepts one or more ferrules, a corresponding ferrule spring, the push/pull tab has a pair of arms configured to wrap partially around a connector back-body. The tab has one or more protrusions that secure the tab to the front body. The back-body in a conventional push/pull tab connector has a spring, the spring is positioned behind the push/pull tab and spring biases forward the push/pull tab. The user pushes the connector into a receptacle, and a front top surface of the connector and front body are latch into a hook contained within the receptacle. This secures the connector into the receptacle.

In the present invention the spring is removed, and a pair of catches protrude from a top surface of the back-body. The catches have a lip that secures the push/pull tab but allows the tab to be moved along a channel extending a predetermined distance along a longitudinal axis of the connector. The longitudinal axis is defined as front to back in the same plane or from a distal neared the cable and boot and a proximal end nearer the ferrules. The shelf on the connector that corresponds to the back-body lip is of a specific length that corresponds to the travel or push/pull a user exerts at the distal end of the connector to secure or remove from adapter receptacle.

The proximal end of the push/pull tab has a chamfered or inclined surface that engages a middle arm of a hook secured inside the receptacle. The tab surface lifts the middle arm, and this in turn lifts a pair of outer arms. The arms are one-piece with the hook body to form the hook. As the middle arm engages a recess at the top surface of the proximal end of the connector, the middle arm pushes the tab forward, as the recess is cut at a slope. This recess pushes the pull/push tab forward as the user inserts the tab using the cable/boot, and the outer arms fall into the recess securing the connector by the hook into the receptacle.

In another embodiment, a plural of hooks types can be deployed in an adapter receptacle. As described above the tab surface lifts the middle arm.

BRIEF DESCRIPTION OF THE DRAWINGS

Embodiments of the invention are described in more detail hereinafter with reference to the drawings, in which:

FIG. 1C1 is a perspective view of the connector of FIG. 1A with a zoomed area;

FIG. 1C2 is the zoomed view of FIG. 1C1 showing a push/pull tab spring;

FIG. 1C3 is the zoomed area of FIG. 1C1 showing a cross section cut away view of a push/pull spring;

FIG. 3B is an exploded view of the connector of FIG. 3A;

FIG. 5A is a zoomed proximal end view of the back-body of FIG. 4 securing a push/pull tab;

FIG. 5B is a zoomed proximal end view of the back-body of FIG. 4 with a cut-away cross section;

FIG. 6B is a perspective view of the push/pull tab partially secured to the back-body of FIG. 4;

FIG. 7C is a perspective view of proximal end of connector as hook arm enters widthwise recess;

FIG. 7D is a cross-section view of FIG. 7C;

FIG. 11A is a perspective view of an alternative hook;

FIG. 11B is a top perspective view of hook FIG. 11A;

DETAILED DESCRIPTION

In the following description, apparatuses for mating opposing multi-fiber optic connectors of differing types or the same type are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
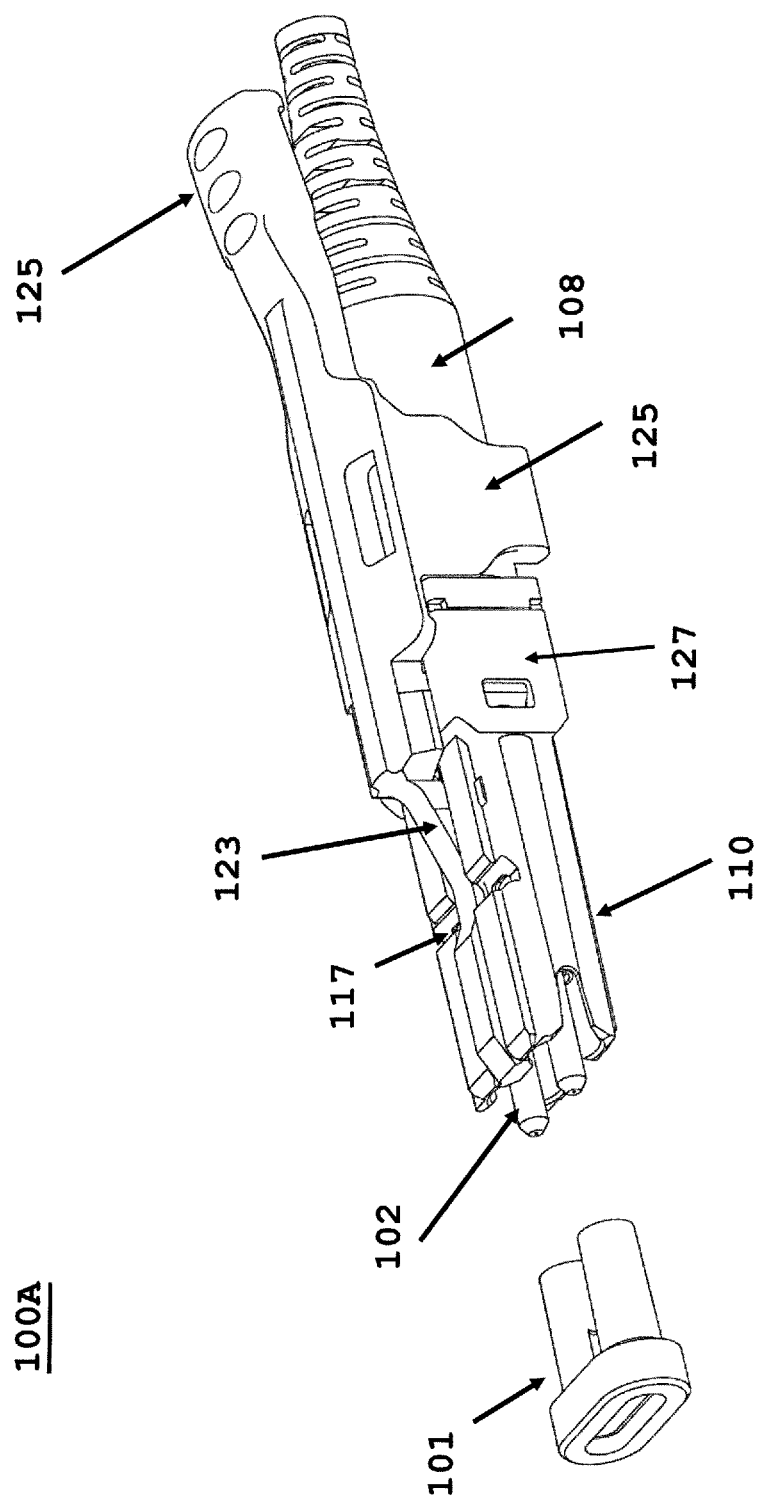
FIG. 1A depicts a fiber optic adapter with a push/pull tab and a dust cap exploded therefrom.
Figure 1B:
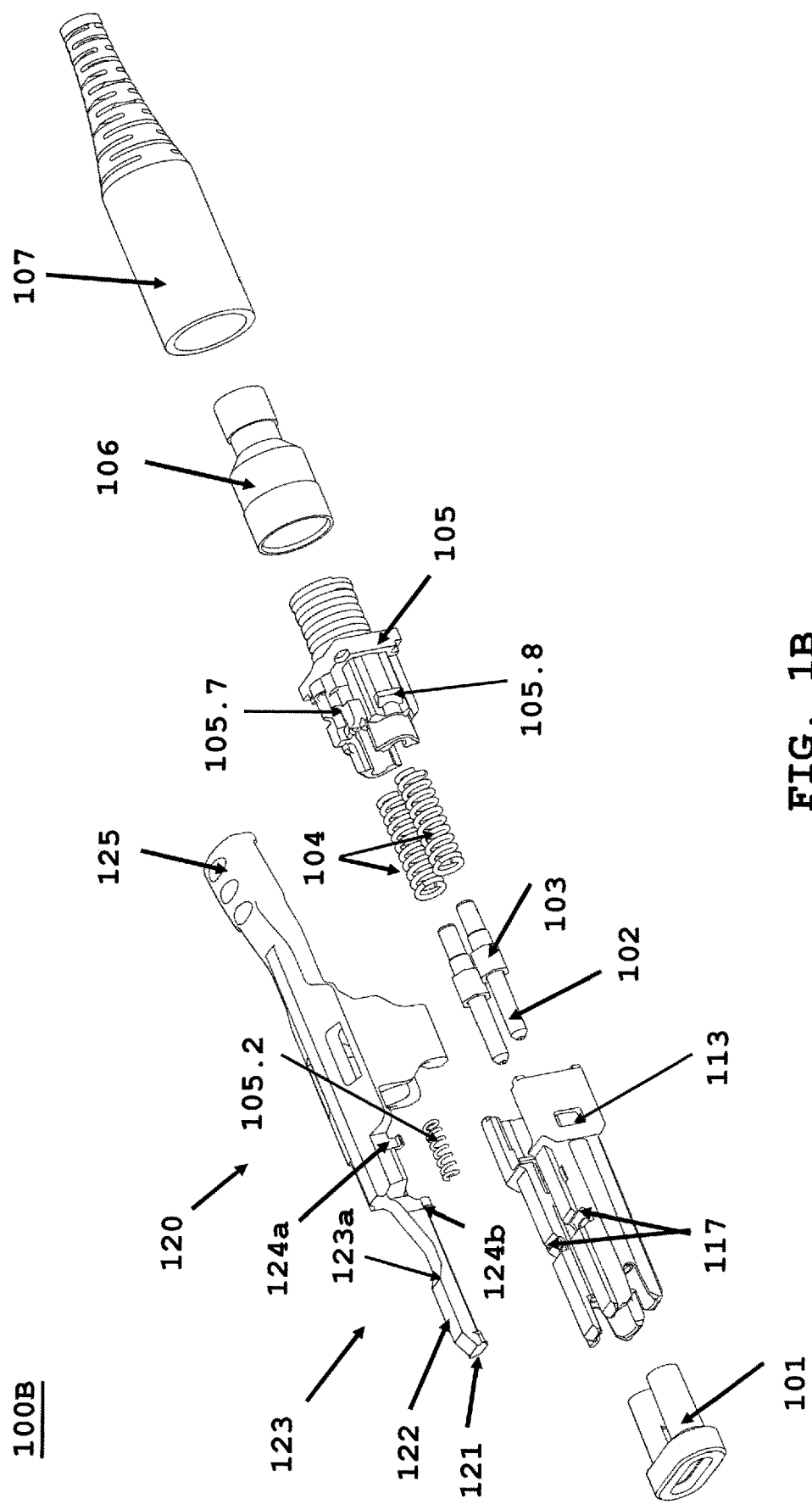
FIG. 1B depicts an exploded view of the connector of FIG. 1A.
Figure 1D:
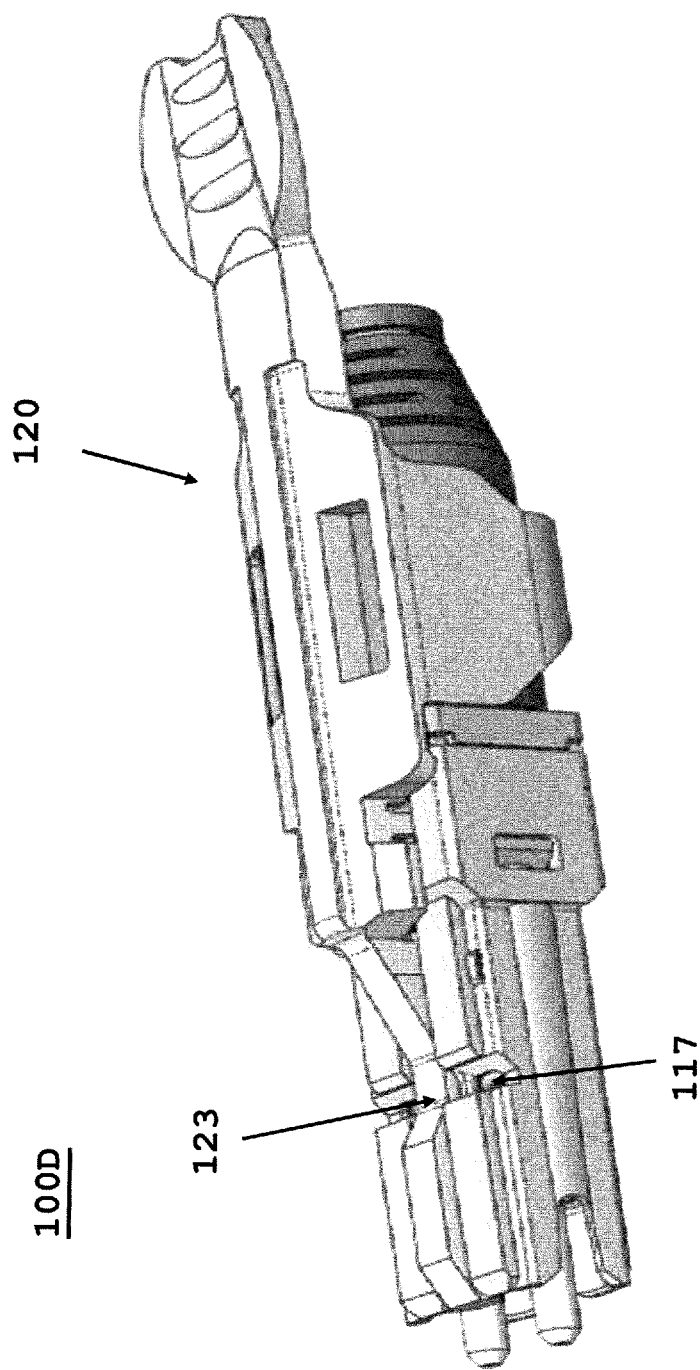
FIG. 1D is a perspective view of connector of FIG. 1A with a short boot and long push/pull tab.

FIG. 1A depicts a conventional push/pull connector with a front body 110, a pair of tabs 125 formed as part of a push/pull tab 120, the tabs 125 are configured to wrap around connector housing 127 and cable/boot assembly 108. The push/pull tab 120 has a proximal end near ferrules 102, the proximal end has a widthwise recess 117, ramp area 123 on an outer surface of front body 110. A dust cap 101 can be used to protect ferrules from debris. FIG. 1B depicts an exploded view of FIG. 1A. The connector 100A components are separated or exploded as connector 100B. Referring to FIG. 1B, pull/push tab 120 has a tab or handle 125, a bias spring 105.3, a first and second securing protrusion 124a, 124b respectively, a slope 123a which is part of the ramp area 123, and raised surface 122 and a front slope or chamfer 121. The securing protrusions are configured to lock into corresponding openings or recesses on an outer surface of the connector body to aid in securing push/pull tab 120 to the connector 100A without interfering in the longitudinal movement of push/pull tab 120. The bias spring 105.3 urges forward pull/push tab 120 as known in the art, and its removal is a non-obvious improvement over the art for fiber optic connectors with a push/pull tab. As described in more detail below, chamfer 121 engages a middle hook arm (not shown) of a hook inserted into an adapter receptacle. This chamfer is configured to lift the middle hook arm until the arm reaches a distance as defined by top surface 122. As described below, middle arm is connected to a pair of outer arms, so as middle arm is lifted, outer arms are deflected upwards.

Continuing with FIG. 1B, a widthwise recess 117 is located at an outer surface of front body 110. Front body 110 holds a plural of ferrules 102, the ferrules are contained within flange 103 that is configured to secure ferrules 102 inside front body 110. Ferrules 102 are urged forward by springs 104. The springs 104 are contained at a proximal end of back-body 105. Cut-out 105.7 accepts push/pull bias spring 105.2. In the present invention, this spring 105.2 is removed as described below.

Referring to FIG. 1B, crimp ring 106 is covered by boot 107 to form cable/boot assembly 108. The final assembly occurs from a distal to proximal end, with the ferrules inserted into front body, back-body restrains springs 104 forward when back-body latches 105.8 are inserted into front body at an opening 113. The boot assembly is screwed onto a distal end of back-body, although other methods are well known in the art.

FIGS. 1C1-1C3 depict a top surface of front body at a proximal end of connector 100A. FIG. 1C1 is a perspective view of connector 100A with a front body 110 at a proximal end and a pull tab handle 125 at a distal end of connector 100A. FIG. 1C1 zoomed area is shown enlarged in FIG. 1C2. FIG. 1C2 depicts bias spring 105.2 located within back-body cut-out 105.7, and configured to bias forward push/pull tab 120. Further disclosed is securing protrusion 124a press-fitted into a corresponding opening in connector body 127. A second securing protrusion 124b is press-fitted into a corresponding opening in body 127. These protrusions 124a, 124b slide in a channel formed in the connector body openings, the channel is sized so push/pull tab 120 can travel to secure and unreleased connector 100A with hook (not shown) located in a receptacle (not shown). FIG. 1C3 depicts a second zoomed view of FIG. 1C1. This view is a cross-section showing bias spring 105.2 located within push/pull connector tab body, and said spring is biasing forward the push/pull tab 120 as known in the prior art. FIG. 1D depicts an alternate conventional connector 100D fully assembled. The push/pull tab 120 is biased forward by bias spring (not shown), as indicated by lowest point of push/pull ramp 123 substantially aligned with widthwise recess 117.

Figure 1E:
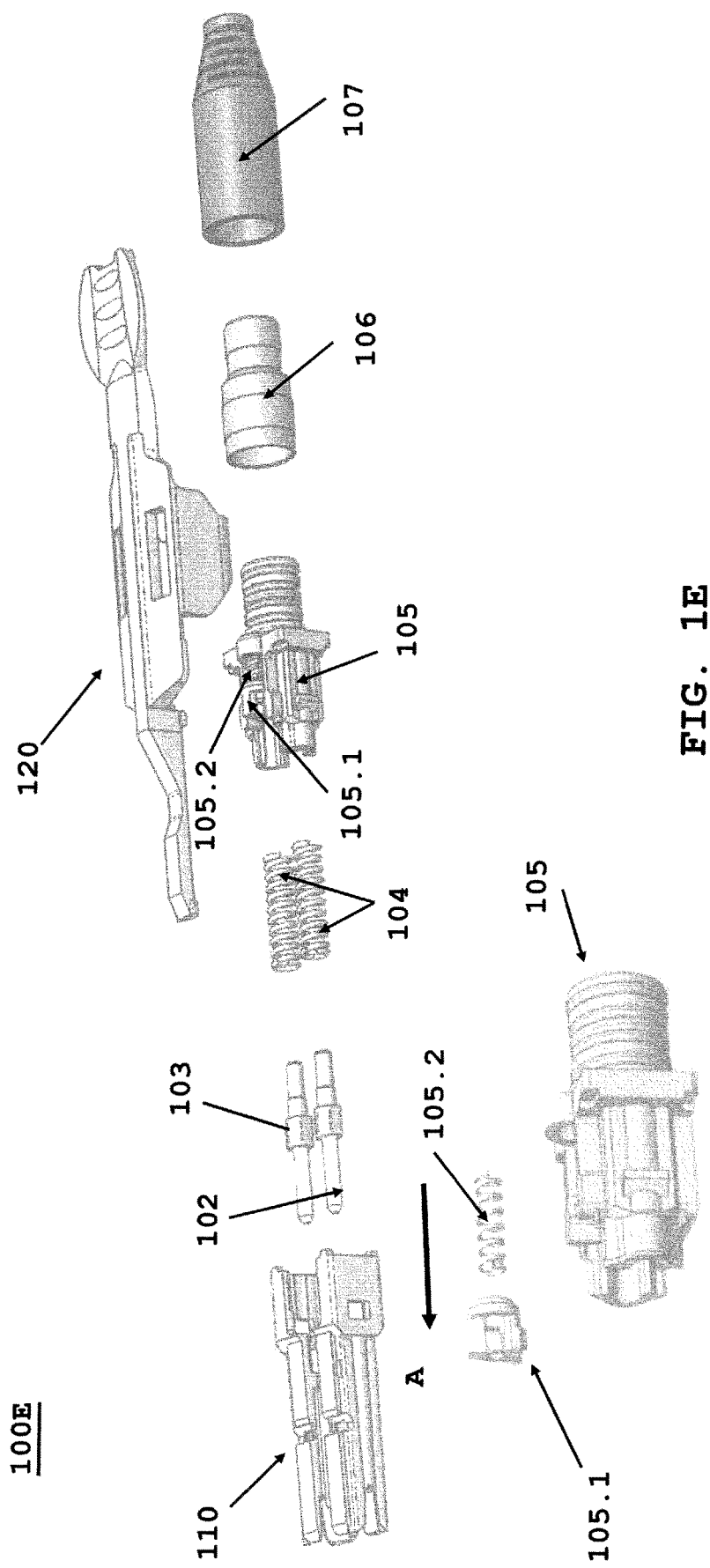
FIG. 1E is an exploded view of the connector of FIG. 1D depicting a push/pull tab spring prior to insertion into a back-body.

FIG. 1B depicts connector 100D exploded showing major components. Referring to FIG. 1B like components have the same element number, for example bias spring 105.2 is shown inserted in cutout of back-body 105 in FIG. 1E. FIG. 1E further shows bias spring 105.2 prior to insertion into spring holder 105.1 in direction of arrow "A". Comparing FIG. 1B and FIG. 1E illustrates differ versions of push/pull connector using bias spring 105.2 to urge forward tab 120.

Figure 2B:
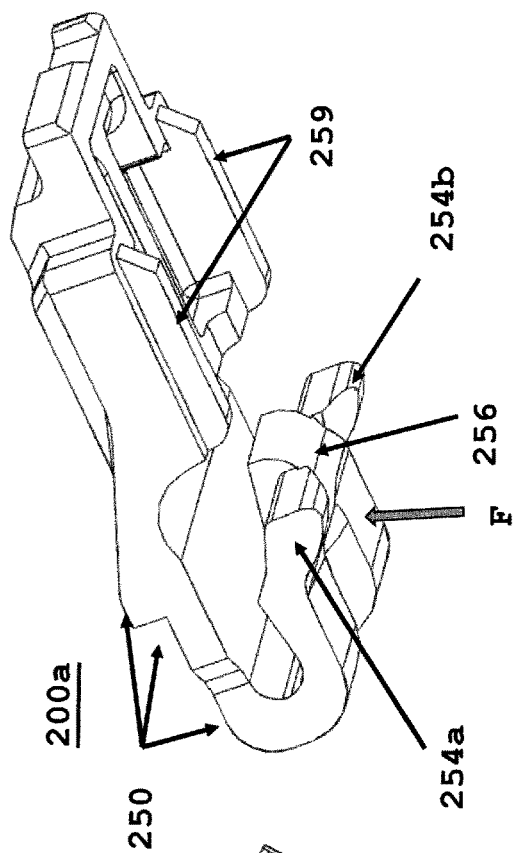
FIG. 2B is a bottom perspective view of hook of FIG. 2A.
Figure 2A:
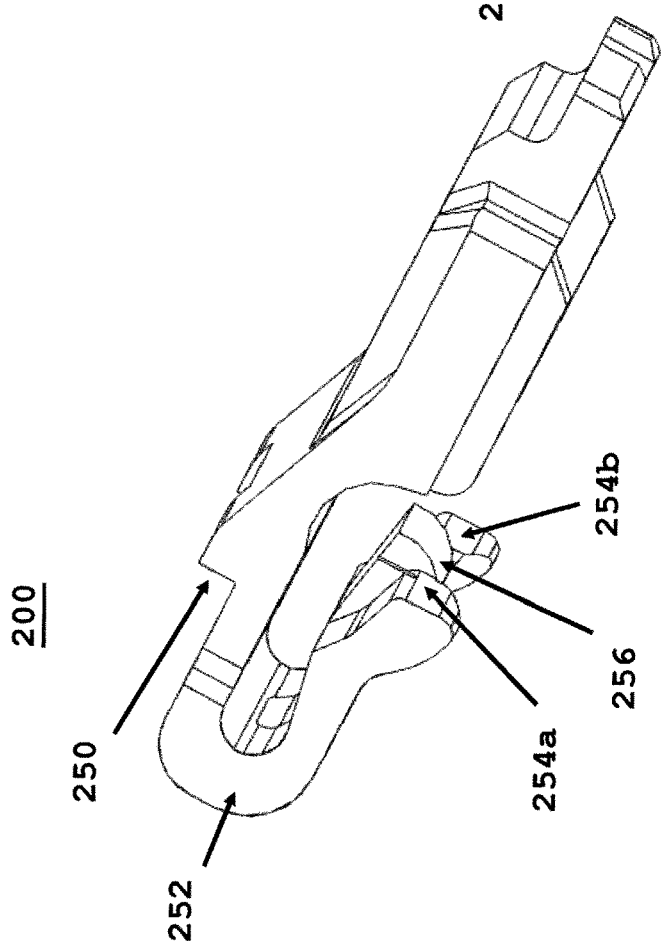
FIG. 2A is a perspective view of a hook inserted into receptacle to secure a connector therein.

FIG. 2A depicts a hook 200 inserted into a receptacle or adapter receptacle or opening (not shown) for securing connectors (100A, 100D) therein. Hook 200 has a radius 252 that allows arms (254, 256) to be flexed as described herein. The outer arms 254a, 254b are flexed up or raised up when a force is applied to middle arm 256. When force "F" is removed from middle arm 256, outer arms (254a, 254b) return to original position under spring force retained primarily in radius 252. Referring to FIG. 2B, surfaces 250 are configured to engage with corresponding receptacle inner structure to secure hook therein. Legs 259 support a proximal end of hook 200a against corresponding adapter receptacle structure (not shown), and keep arms at a pre-determined height when engaging an outer surface of front body 100 as described herein. This prevents arms from dragging on outer surface of connector top surface resisting movement of push/pull tab by a user.

Figure 3A:
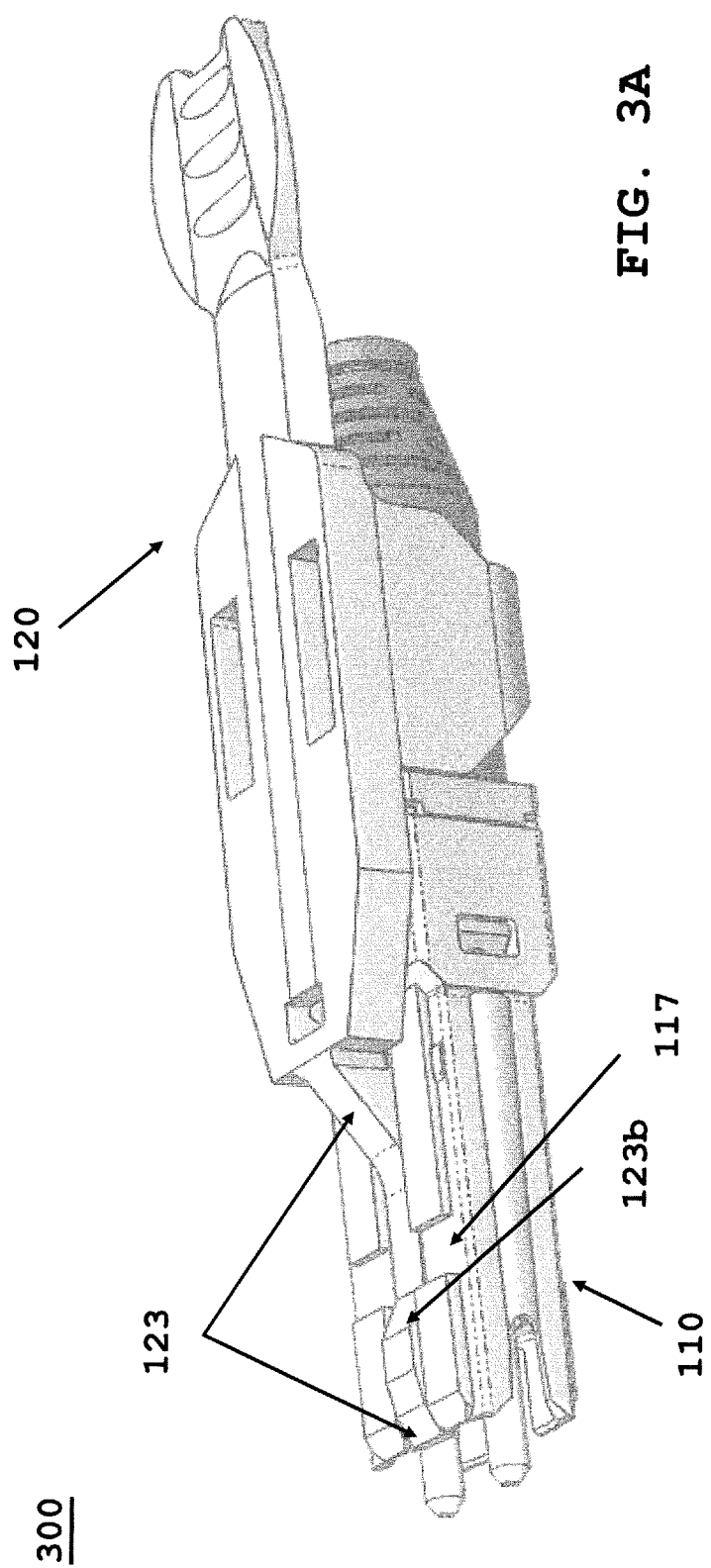
FIG. 3A is a perspective view of a connector of the present invention.

FIG. 3A depicts a push/pull connector 300 of the present invention without a bias spring 105.2. Ramp surface 123 or arm of push/pull tab 120 has a plural of sloped surfaces. These surfaces are configured to engage middle hook arm to lift outer arms. Upon full insertion of connector 300, by pushing on said connector at a distal end, connector 300 is secure within hook 200. According to the present invention, slope 123b is configured to provide an opposing force against middle arm 256 of hook 200 to ensure push/pull tab 120 is urged forward allowing outer arms 254a, 25b to drop into widthwise recess 117 and secure connector into adapter receptacle via hook 200.

Figure 4:
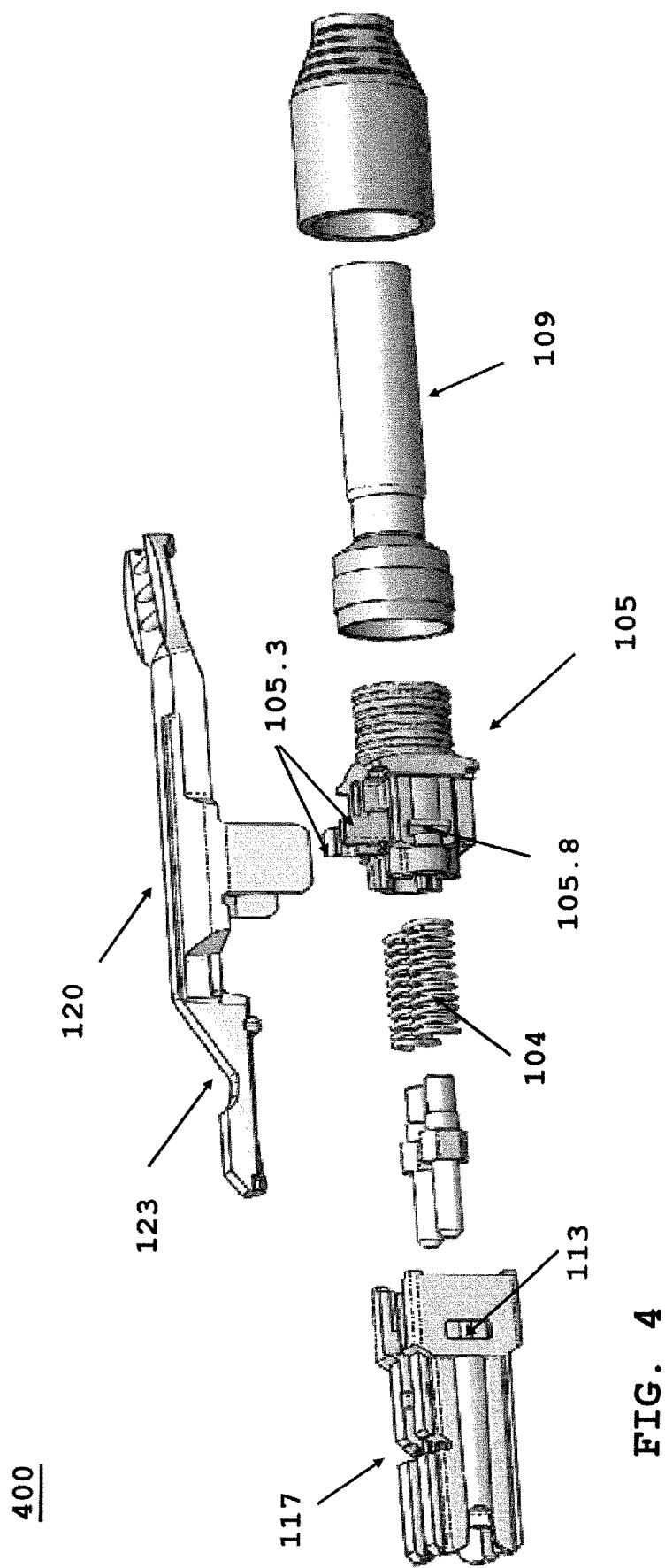
FIG. 4 is an exploded view of the connector of FIG. 3A depicting an alternative back-body.

FIG. 3B is an exploded view of FIG. 3A showing conventional components. A pair of bias springs 105.2 urge pull/push tab 120 forwarded in this connector. FIG. 3B component elements are similar to those corresponding elements as shown in FIG. 1B and FIG. 1E, and described herein. FIG. 4 depicts a push/pull connector 400 according to an embodiment of the present invention without bias spring 105.2. Back-body 105 has a pair of protrusions 105.3 that extend through corresponding openings 128 of push/pull tab 120, as shown in more detail in FIG. 5A. An opening 128/protrusion pair 105.3 lock tab 120 to connector body, while opening 128 is also formed as a channel allowing tab 120 to slide back and forth.

FIG. 5A depicts proximal end of connector 400. Widthwise recess accepts outer arms of hook to secure connector with an adapter receptacle. FIG. 5B cross-section shows ferrule bias spring position between ferrule flange and back-body to urge forward a ferrule 103. Push/pull tab arm 129 contains a plural of slopes or ramps. Ramp 123b is cut or chamfered from about 10 degrees to 35 degrees, and it is this angle that provides an opposing surface force to push upward middle arm 256 of hook 200 or hook 400 (FIG. 11A). Back-body protrusion 105.3 latches onto surface 126 to secure push/pull tab 120 to back-body 105. Surface 126 extends longitudinally a distance needed to release or secure connector, moving tab 120 back and for the along connector axis within a receptacle.

Figure 6A:
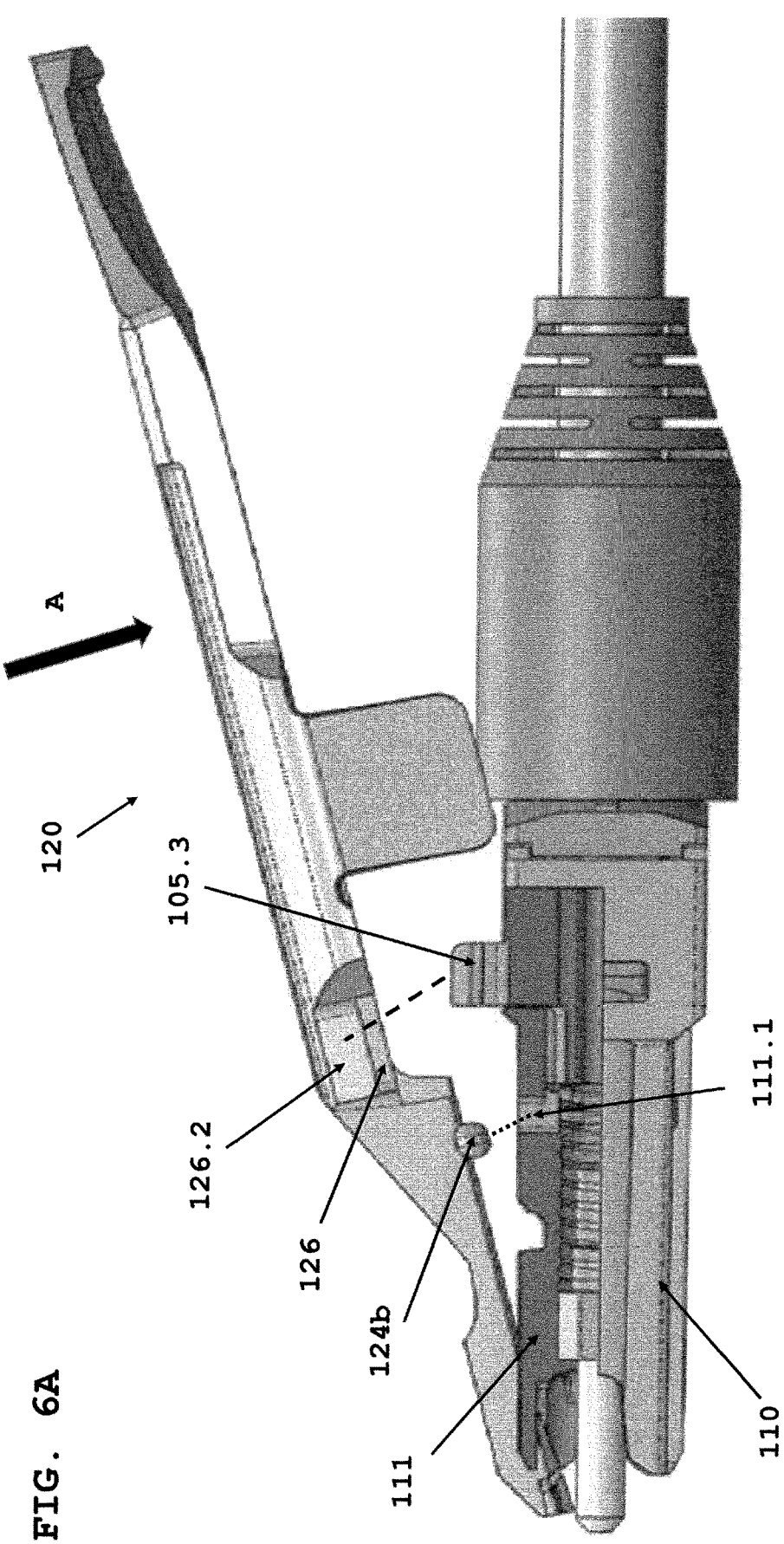
FIG. 6A is a perspective view of the push/pull tab of FIG. 5A being attached to the back-body of FIG. 4.
Figure 6C:
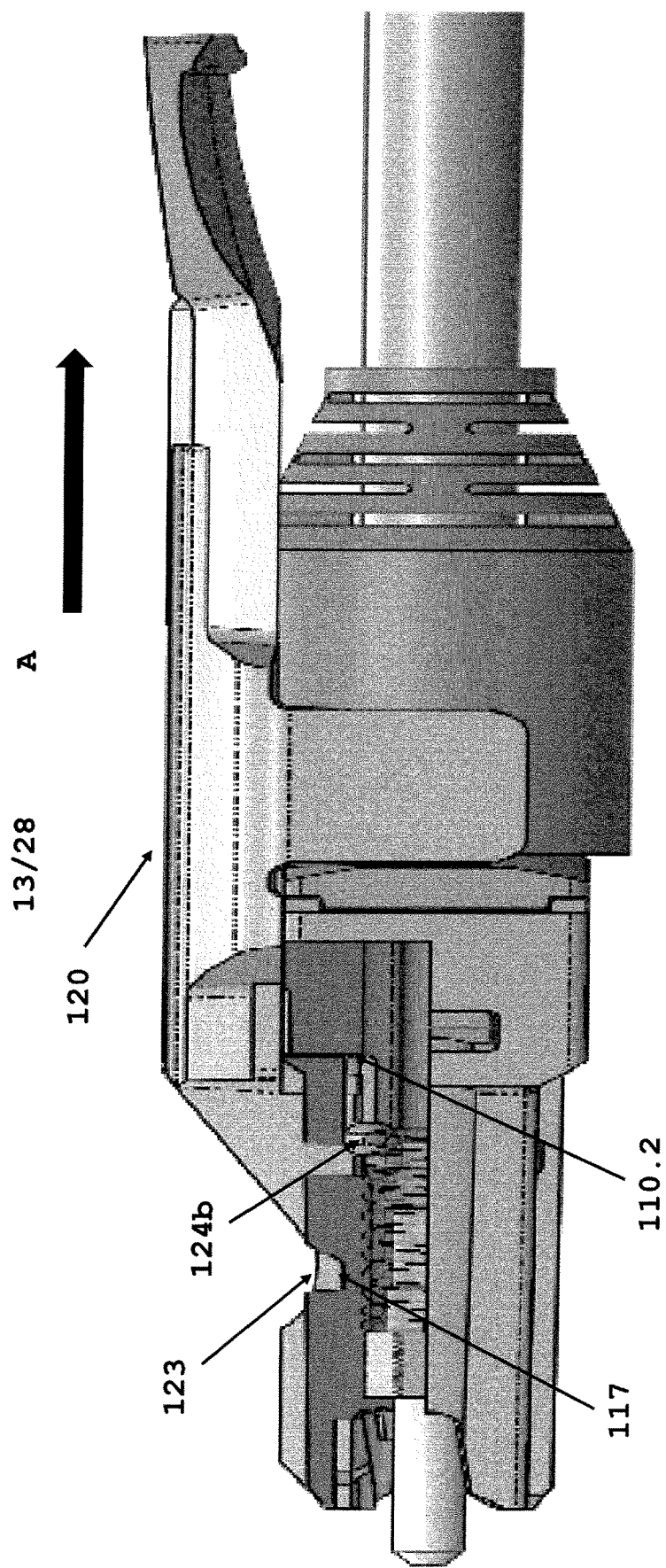
FIG. 6C is a perspective view of the push/pull tab secured by connector back-body.

FIG. 6A depicts attaching push/pull tab 120 to connector body in direction of arrow "A". Back-body protrusion 105.3 attaches to surface 126, and rests against face 126.2. Securing protrusion 124b is accepted into connector body recess 111.1. FIG. 6B shows protrusion 124b inserted into connector body opening. FIG. 6C illustrates as pull/push tab 120 is pulled in direction of arrow "A", protrusion 124b travels along a channel until it is stopped by face 110.2. When tab 120 is push forward, protrusion 124b ensures ramp area 123 lowest point is substantially aligned with widthwise recess 117.

Figures 7A, 7B:
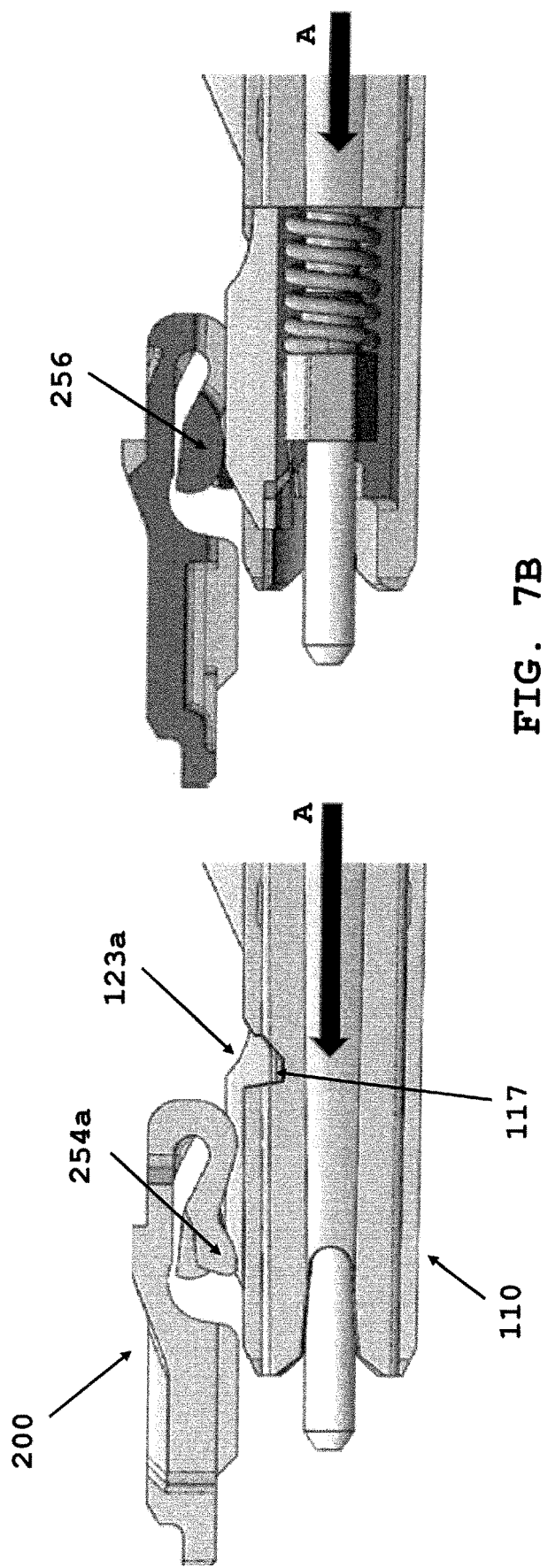
FIG. 7A is a perspective view of proximal end of connector as hook engages push/pull front end.
FIG. 7B is a cross section view of proximal end of connector as hook engages push/pull front end.
Figure 7E:
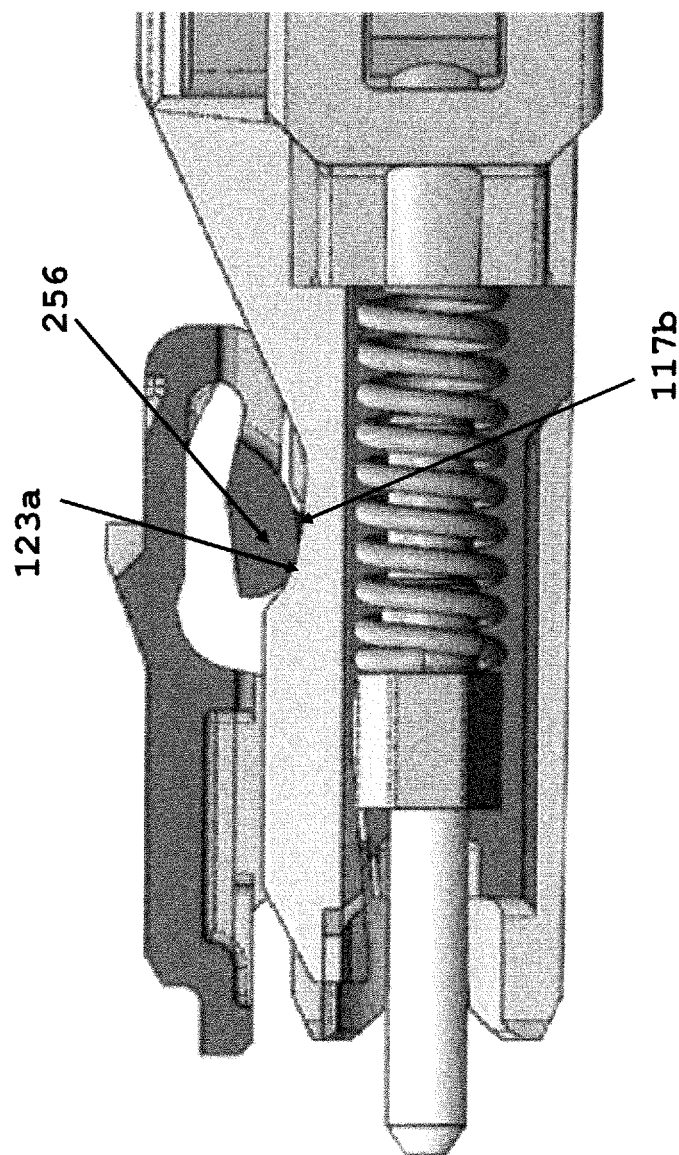
FIG. 7E is a cross-section view of hook middle arm along ramp slope in the process of securing connector.
Figure 7F:
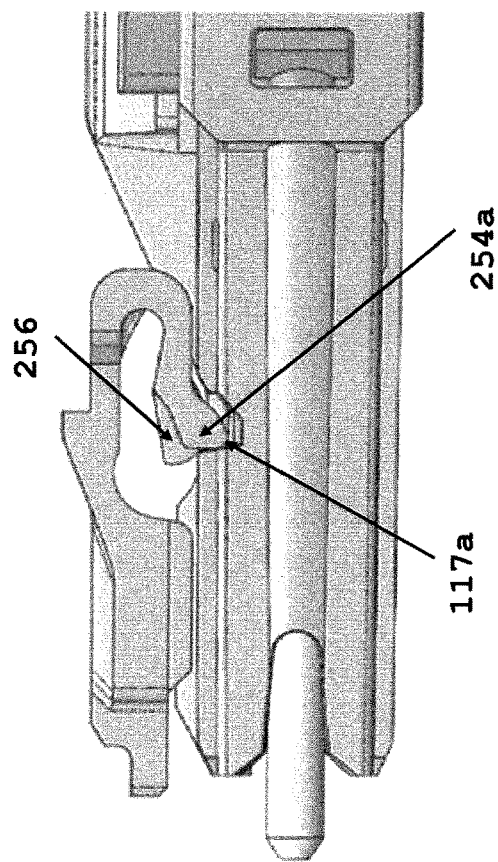
FIG. 7F is a perspective view of proximal end of connector as outer arm becomes lodged in widthwise recess.
Figure 7G:
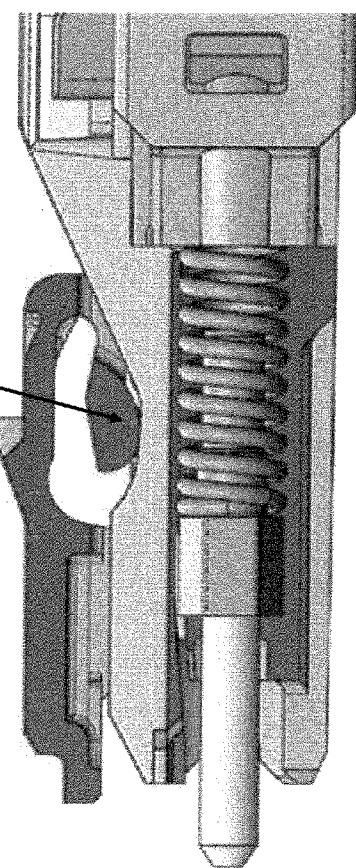
FIG. 7G is a perspective view a cross-section view of FIG. 7F showing middle arm along ramp slope.

FIGS. 7A-7G depict operation of connector 400 without bias spring 105.2, as connector 400 is being secured in an adapter receptacle (not shown) having a hook 200 therein. FIG. 7A depicts hook 200 middle arm 256 engaging surface 122. This lifts outer arms 254a, 254b up. The outer arms 254a, 254b are spaced apart so as not to interfere with push/pull tab arm 129. As shown slope 123a is covering recess 117, as middle arm is pushing back push/pull tab arm 128 toward a distal end of connector 400, as hook arms are being raised. FIG. 7B depicts middle hook 256 being raised by connector arm 128 surface 122. FIG. 7C depicts continued insertion of connector into receptacle. A radius 252 of hook 200 contacts a surface of ramp area 123, this pushes back connector arm 129. As middle arm is raise a force is stored in radius 252 that pushes outer arms outward into recess 117 as described herein. As discussed above protrusion 124b (FIG. 6C) meets face 110.2, which prevents push/pull tab from further distal travel. At this insert point, middle arm 256 is raised maximum, for hook 200 design, and outer arms 254a, 254b (not shown) begin to release tension and become secured in recess 117. As shown in FIG. 7C, a proximal face of outer arms is now pressing with its stored spring force on connector body 110 via recess face 117a. This is the start of hook 200 securing connector 400 within a receptacle. FIG. 7D depicts a cross-section view of FIG. 7C, showing middle arm 256 urging forward push/pull connector arm 129, as the arm 256 is relaxed along chamfer 123a. As described above best chamfer angle moves arm 129 forward smoothly without the need for a bias spring 105.2. FIG. 7E shows middle arm 256 moving along tab profile or chamfer, and as middle arm presses down by store spring force, this causes connector arm 129 (push/pull tab 120) to move forward. As tab 120 moves forward outer arms 245a, 245b come to rest in recess 117 securing connector within receptacle. FIG. 7G depicts middle arm 256 reaching lowest point of ramp profile 123. At this point outer arms 254a have extended further into recess 117 and continue to push of recess face 117a. The outer arms have reached locking position securing connector 400 into adapter receptacle via hook 200.

Figure 8:
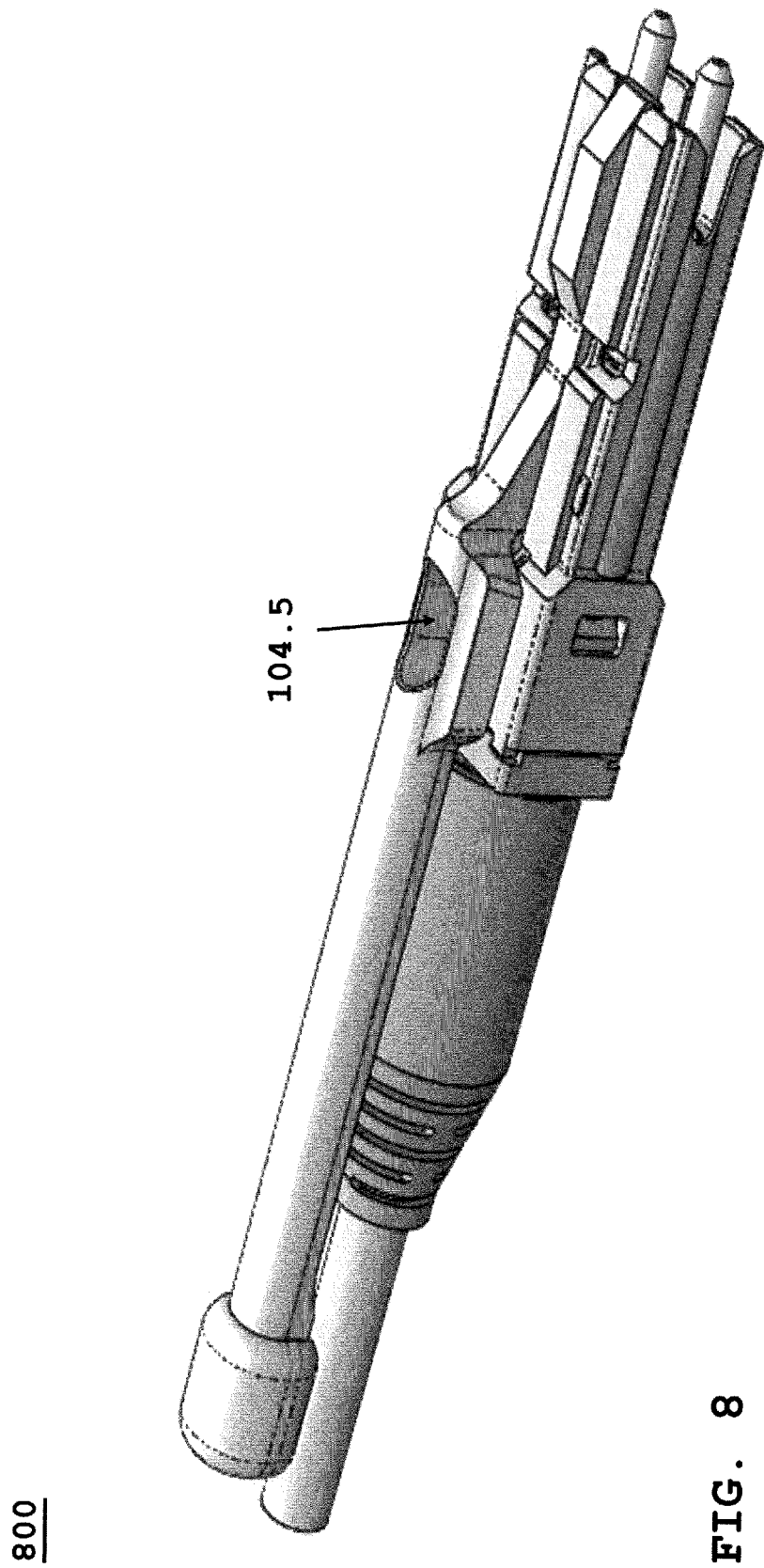
FIG. 8 is a perspective view of a connector according to the present invention.
Figure 9:
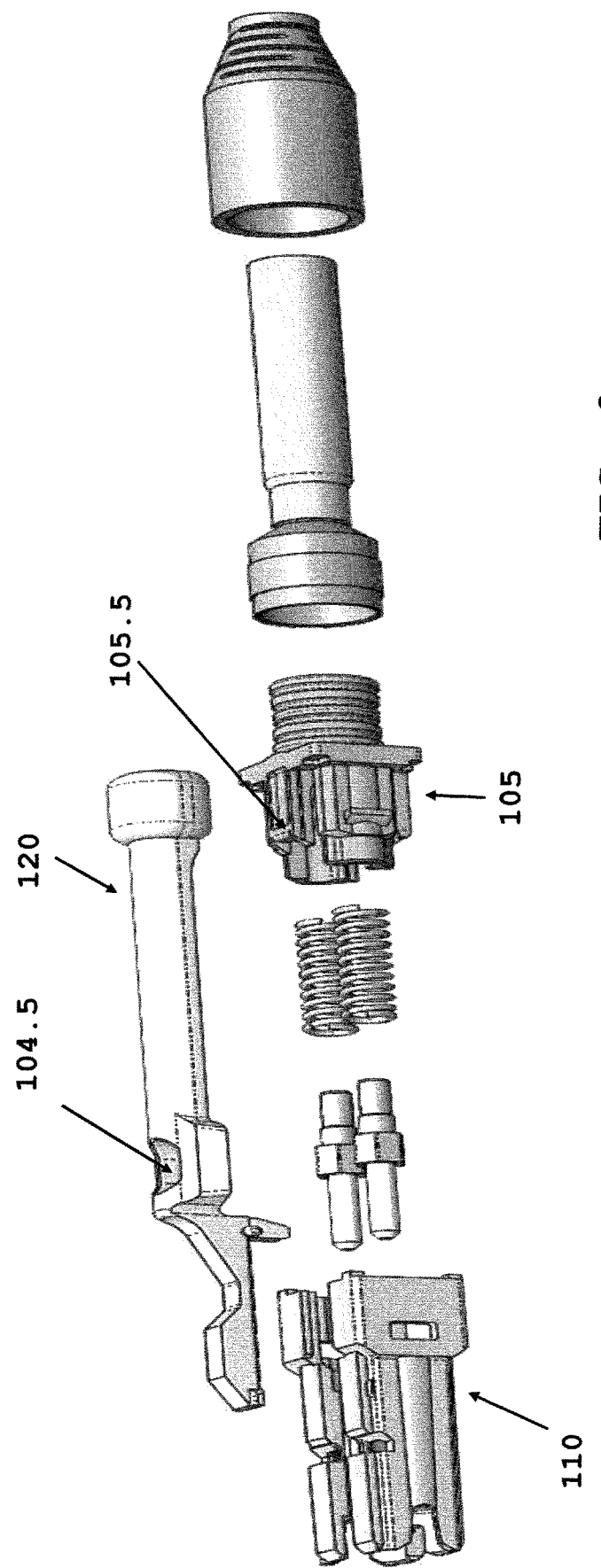
FIG. 9 is an exploded view of connector of FIG. 8.
Figure 10:
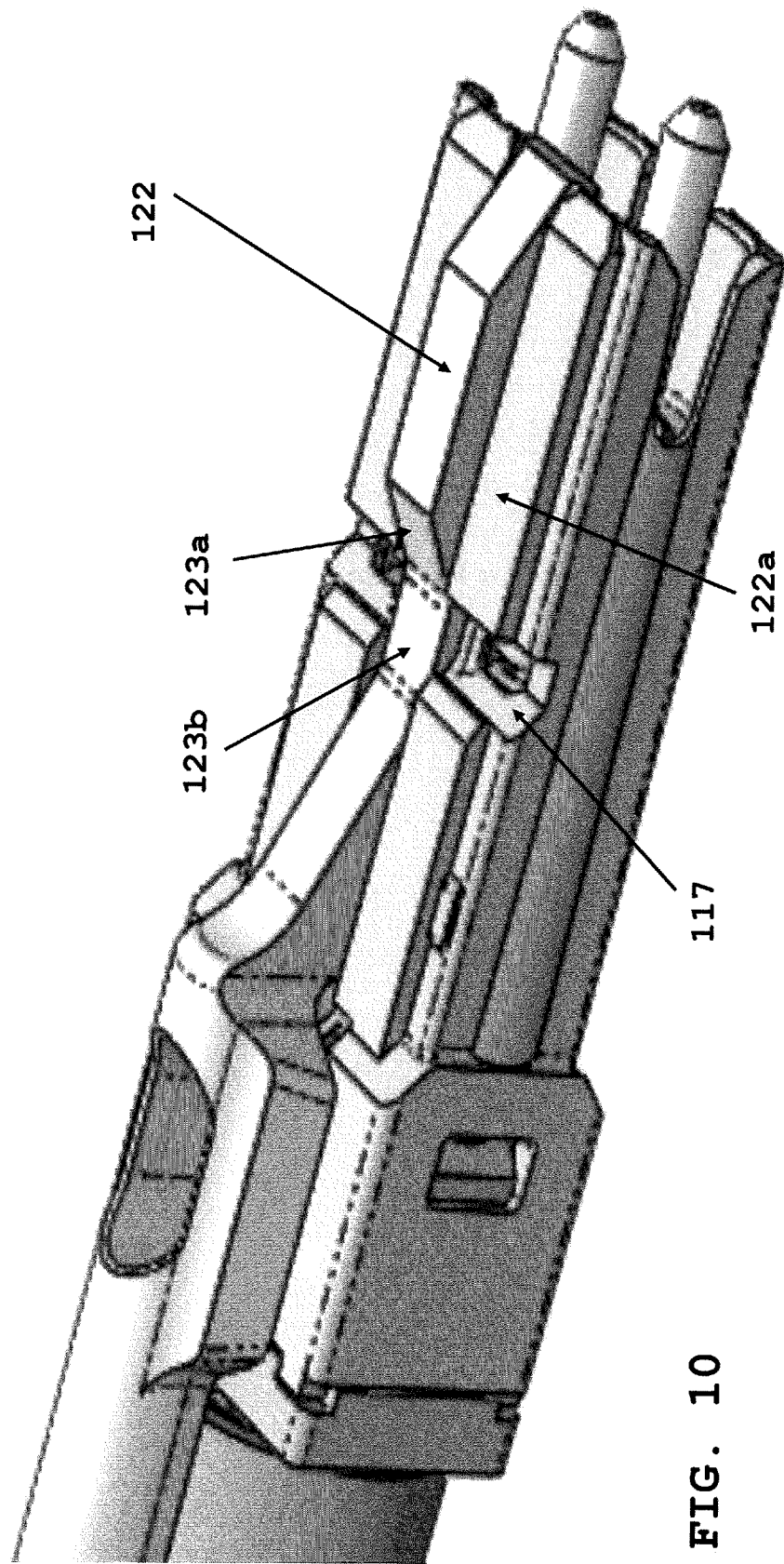
FIG. 10 is a zoomed view of proximal end of connector of FIG. 8.

FIG. 8 depicts an alternative push/pull connector 800 capable of removing push/pull tab 120 using a removal tool 870 inserted into opening 104.5. FIG. 9 depicts an exploded view of connector 800. Like elements are similar to elements found in FIG. 1B. FIG. 10 is a zoomed view of proximal end of connector 800. The lowest point 123b of ramp area 123 is substantially even with recess 117 opening when push/pull tab 120 is biased forward. Raised surface 122 flexes middle arm 256 upward raising outer arms 254a, 254b. The outer arms are raised by middle arm to substantially avoid contact with surface 122a, allowing connector 800 be inserted into receptacle without becoming stuck.

FIG. 11A depicts an alternative hook 400. Like hook 200, hook 400 outer arms 254a, 254b are moved upward by raised surface 122. Surface 122 is accepted in channel 254c. Legs 259, as in hook 200, contact surface 122a, 122b are connector is inserted into receptacle. FIG. 11B shows contact surface 126 that secures hook 400 using corresponding structure in adapter receptacle.

Figure 12B:
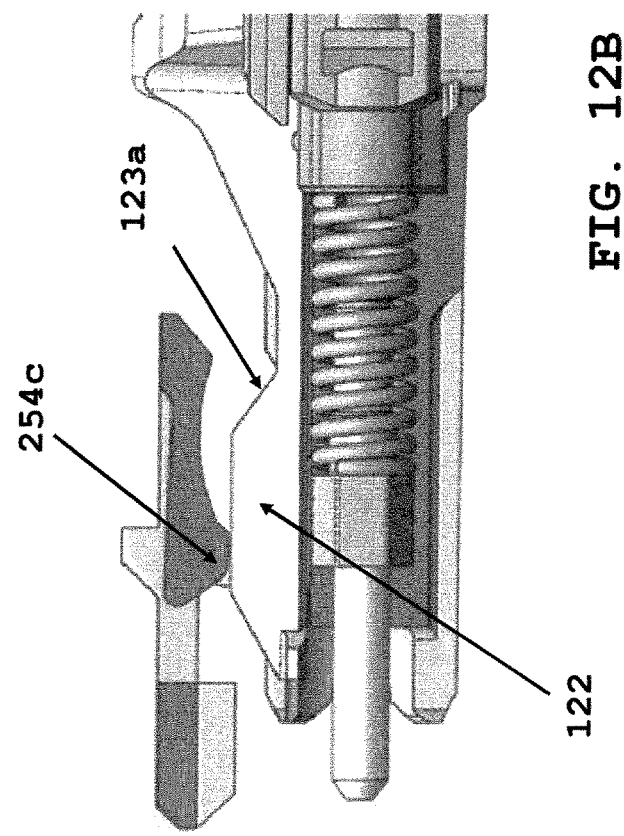
FIG. 12B is a cross-section view of FIG. 12A.
Figure 12A:
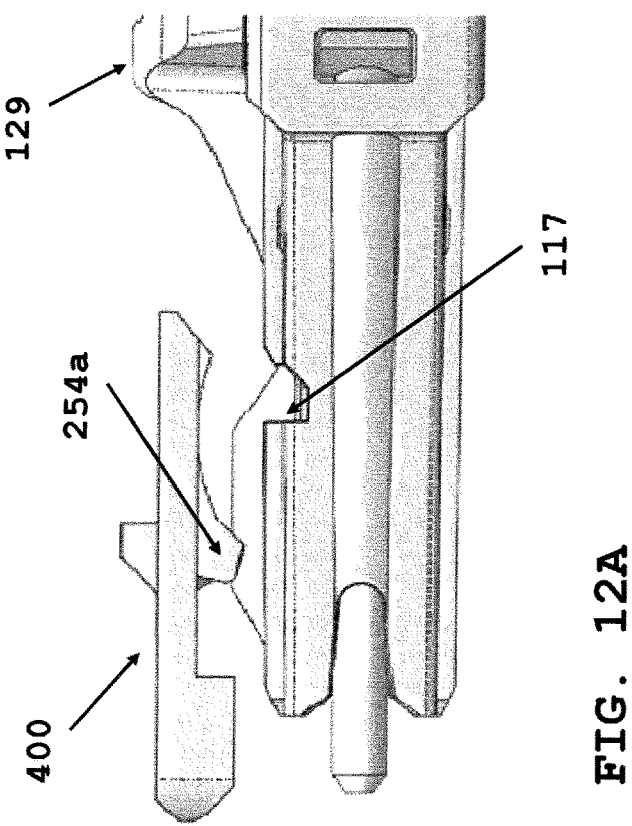
FIG. 12A is perspective view of proximal end of connector of FIG. 8 engaging hook of FIG. 11A.

FIG. 12A depicts the start of inserting connector 800 into a receptacle having hook 400 secured therein. As connector 800 is inserted pull tab arm 129 is pushed in a distal direction as shown by proximal arm 126 within width-wide recess 117. Middle arm 254c is raised, FIG. 12B, which raised outer arms 254a. Hook 200 or hook 400 is secured within adapter receptacle, so as connector practicing the invention is pushed in by its boot, connector arm moves distally until protrusion 124b is stopped. FIG. 12B depicts cross-section as hook is opening under force of middle arm 254c being raised by raised surface 122. The raised surface is sometimes called a hook region where connector arm 129 is acting on a hook.

Figure 13B:
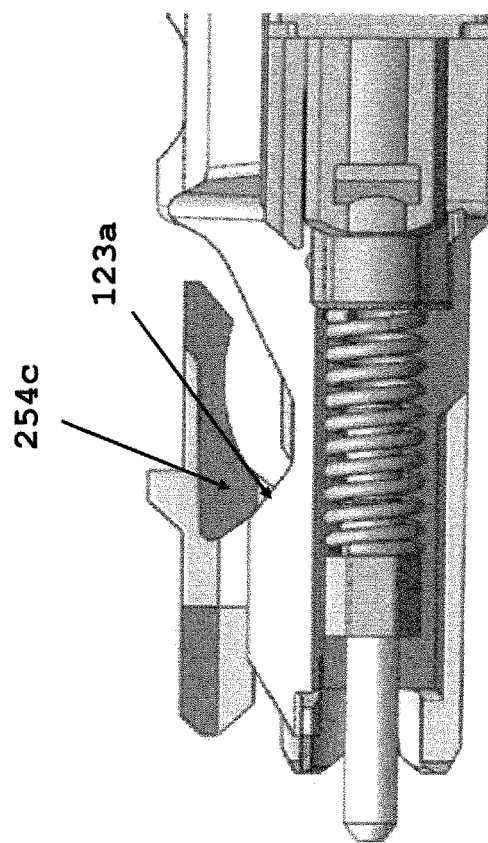
FIG. 13B is a cross-section view of FIG. 13A.
Figure 13A:
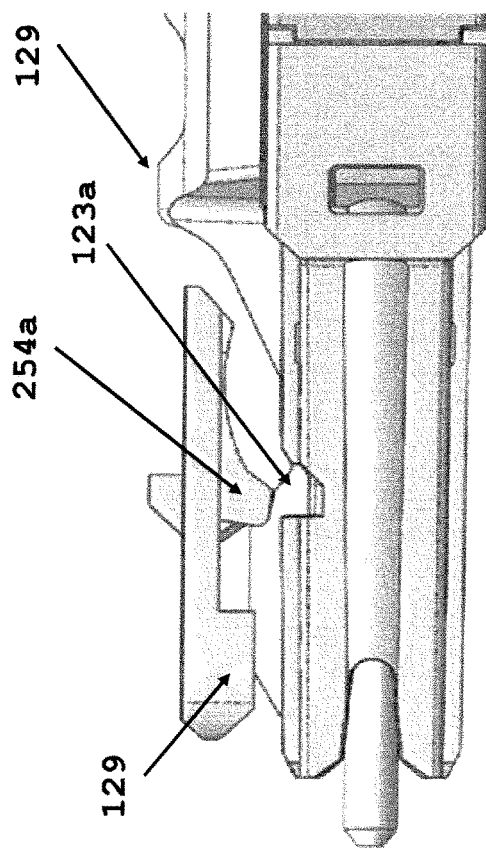
FIG. 13A is a perspective view of proximal end of connector of FIG. 8 beginning to install hook of FIG. 11A in widthwise recess.
Figure 14:
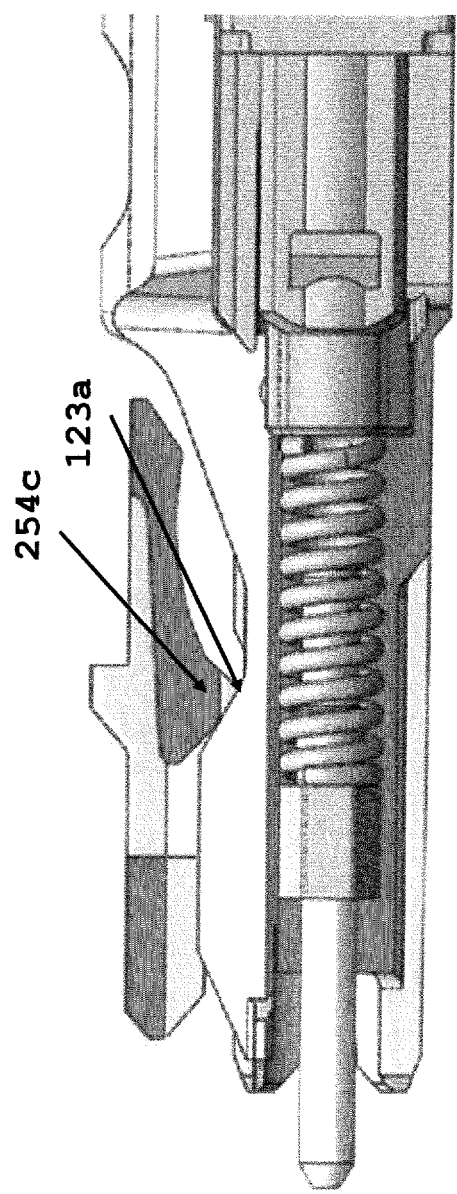
FIG. 14 is a cross-section view of hook of FIG. 11A partially engaging widthwise recess.

FIG. 13A depicts hook 400 reaching chamfered surface 123b. Outer arm 254a pushes push/pull tab arm 129 toward a proximal end of connector 800. FIG. 13B depicts middle arm 254c reaching a turning point of ramp area, where chamfered surface 123a is biasing connector arm 129 forward without the use of a bias spring 150.2. FIG. 14 depicts middle arm 254c releasing its tension biasing push/pull tab arm 129 forward, as middle arm moves along profile 123a. This profile has an angle or slope between 20 to 35 degrees for maximum proximal bias of push/pull tab arm 129.

Figure 15B:
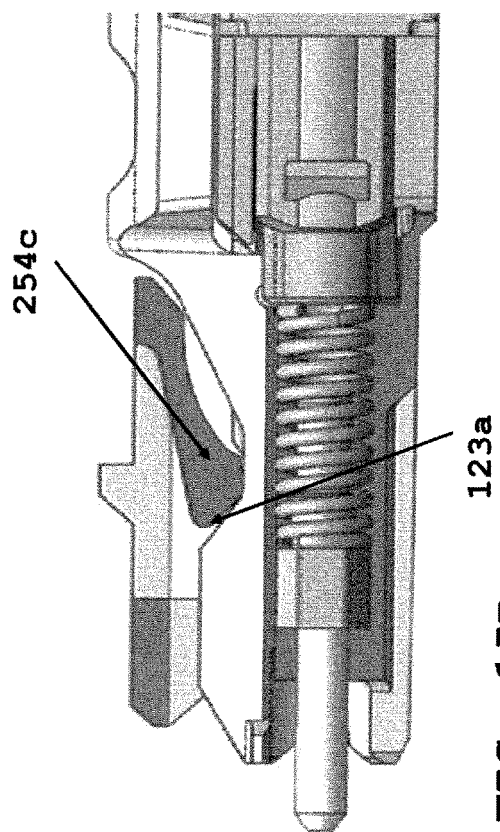
FIG. 15B is a cross-section view of FIG. 15A.
Figure 15A:
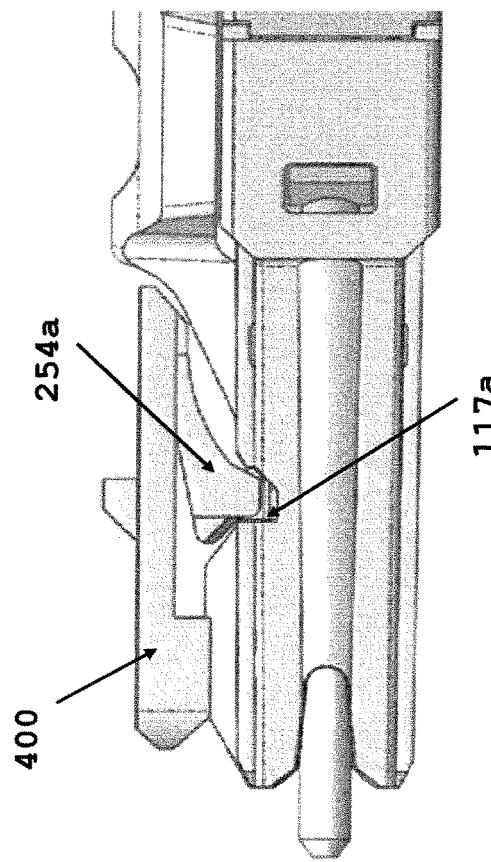
FIG. 15A is a perspective view of hook of FIG. 11A engaged in widthwise recess securing connector.

FIG. 15A depicts hook 400 fully inserted and its outer arms 254a, 254b engaged in recess 117, and pushing on recess surface 117a. This secures connector 800 within an adapter receptacle. FIG. 15B is cross-section of hook 400 reaching ramp profile lowest point, with tab 120 biased forward. Middle arm 254c is pushing on ramp profile 123a securing connector in adapter with tab forward.

Figure 16A:
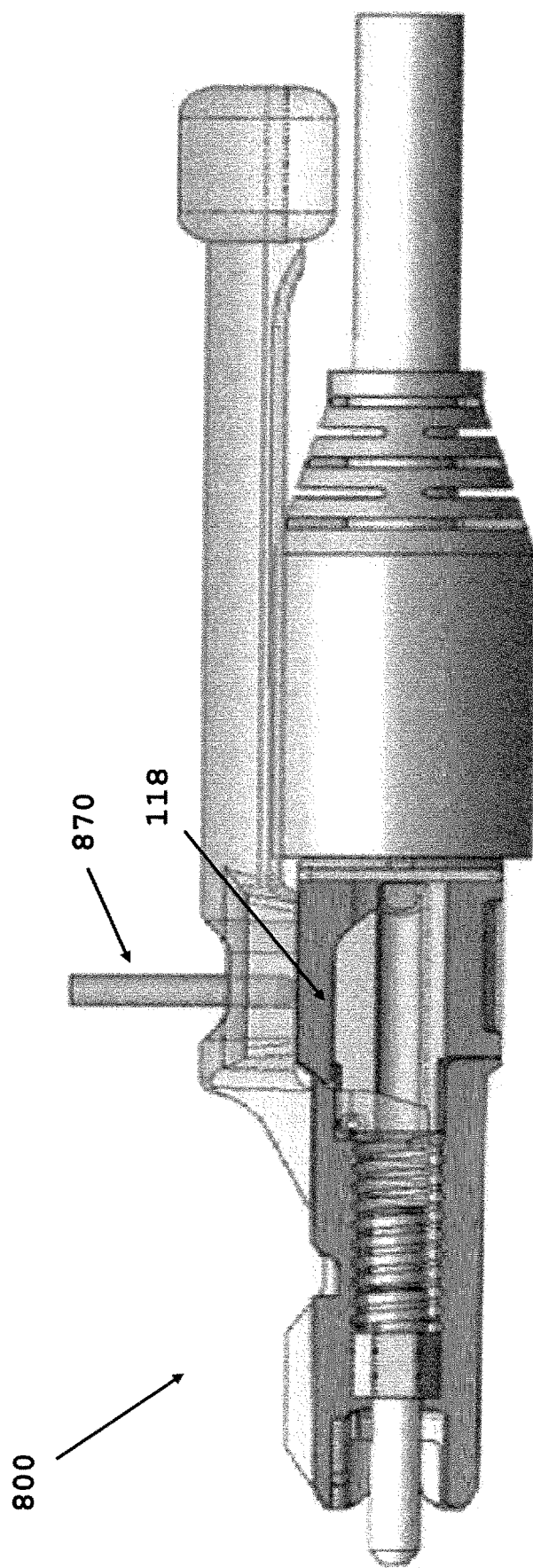
FIG. 16A is a side perspective view of the FIG. 8 connector with a cross-section cut-out view.
Figure 16B:
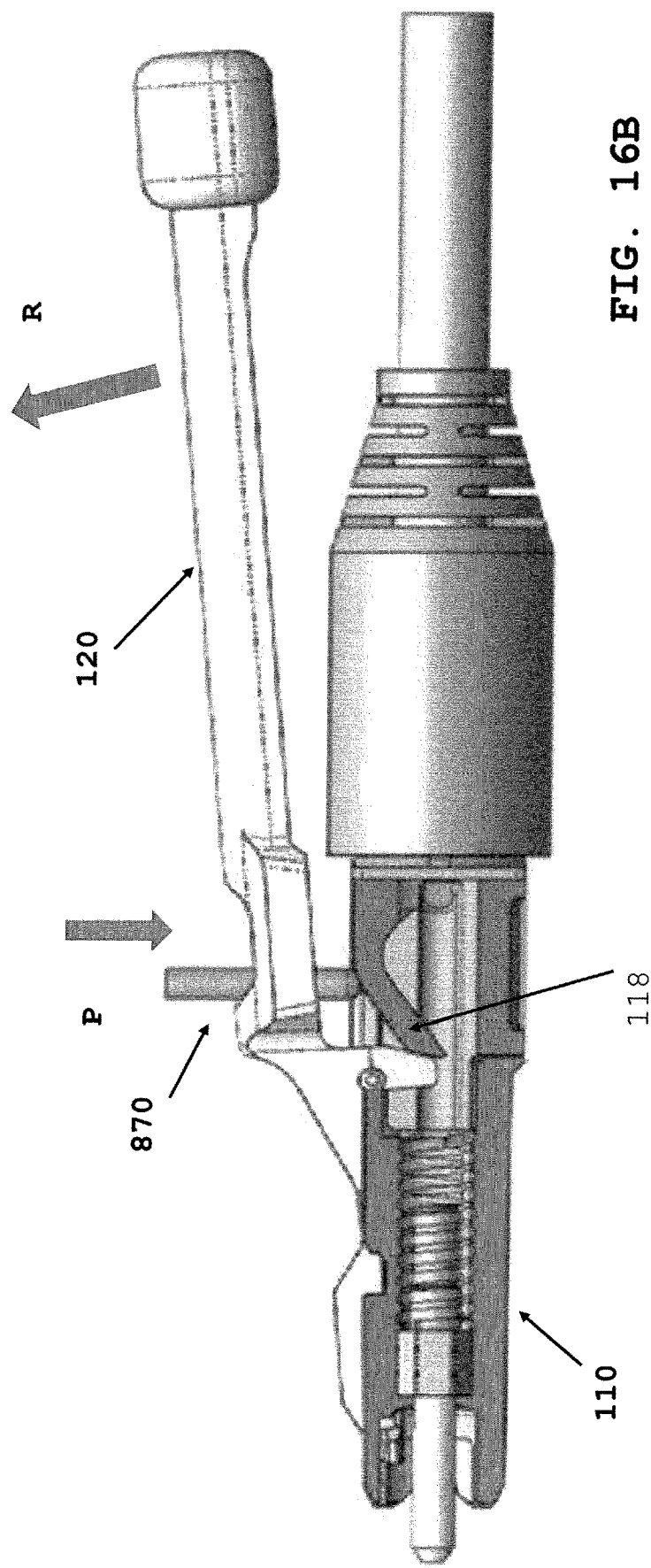
FIG. 16B is a view of FIG. 16A during removal of tab in direction of arrow "R"
Figure 16C:
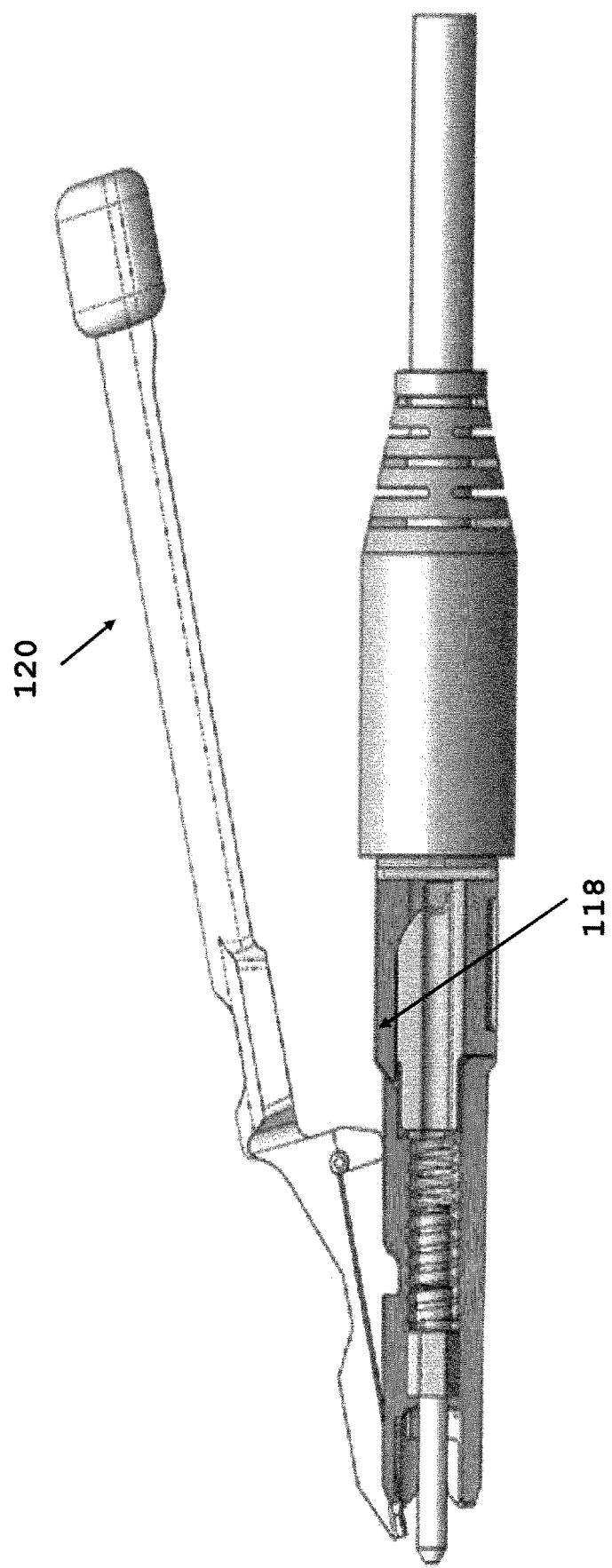
FIG. 16C is a perspective view of FIG. 16A connector with tab removed from connector body.

FIG. 16A depicts connector 800 with a removal tool 870 inserted into an opening 104.5, as shown in FIG. 8. Tool 870 is positioned at surface of a deformable tab 118. FIG. 16B depicts connector 800 and as tool 870 is pushed in direction of arrow "P", deformable tab 118 moves downward, as shown within front body 110, and user can pull up tab 120 in direction of "R" to remove tab 120 from connector 800 body. FIG. 16C shows tab 120 removed from connector 800 body, and deformable tab 118 returns to an unbiased position as shown in FIG. 16A.

An ordinarily skilled person in the art can appreciate that by following the principal of the present invention, a version of the adapter for mating a multi-fiber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic connector comprising:
   a housing having a proximal end and a distal end,
   a back body having a protrusion is secured within the housing;
   a push/pull tab having a front slope and a recessed face along a side; and
   wherein the push/pull tab is releasably secured to the connector with the back body protrusion secured within the recessed face after the front slope is secured within a slot at a proximal end of the housing.

2. The fiber optic connector of claim 1, wherein the securing protrusions are inserted into an opening of the housing.

3. The fiber optic connector of claim 1, wherein the push/pull tab has a handle at a distal end.

4. The fiber optic connector of claim 3, wherein the push/pull tab is retracted distally and a securing protrusion travels within a channel in the housing until reaching a stop face within said housing.

5. The fiber optic connector of claim 4, wherein the connector is disconnected from an adapter after securing protrusion reaches the stop face.

* * * * *